United States Patent
Baumatz

(10) Patent No.: US 9,188,481 B2
(45) Date of Patent: *Nov. 17, 2015

(54) SENSING/EMITTING APPARATUS, SYSTEM AND METHOD

(71) Applicant: Elta Systems Ltd., Ashdod (IL)

(72) Inventor: David Baumatz, Carmei Yosef (IL)

(73) Assignee: ELTA SYSTEMS LTD., Ashdod (IL)

( * ) Notice: Subject to any disclaimer, the term of this patent is extended or adjusted under 35 U.S.C. 154(b) by 445 days.

This patent is subject to a terminal disclaimer.

(21) Appl. No.: 13/681,089

(22) Filed: Nov. 19, 2012

(65) Prior Publication Data

US 2013/0092852 A1    Apr. 18, 2013

Related U.S. Application Data

(63) Continuation of application No. 12/452,440, filed as application No. PCT/IL2009/000663 on Jul. 2, 2009, now Pat. No. 8,330,646.

(30) Foreign Application Priority Data

Jul. 3, 2008 (IL) .......................................... 192601

(51) Int. Cl.
    *G01J 1/42* (2006.01)
    *G01S 13/86* (2006.01)
    (Continued)

(52) U.S. Cl.
    CPC ... *G01J 1/42* (2013.01); *G01S 7/48* (2013.01); *G01S 7/4813* (2013.01); *G01S 13/86* (2013.01); *G01S 17/87* (2013.01); *G01S 17/89* (2013.01)

(58) Field of Classification Search
    CPC ......... G01S 7/48; G01S 7/481; G01S 7/4813; G01S 13/86; G01S 13/865; G01S 13/867; G01S 17/66; G01S 17/88; G01S 17/895; G01S 17/89; G01S 17/87; G01J 1/42
    See application file for complete search history.

(56) References Cited

U.S. PATENT DOCUMENTS 3,992,629 A    11/1976   Chapman
4,158,840 A     6/1979   Schwab
(Continued)

FOREIGN PATENT DOCUMENTS

GB    1 178 089    1/1970
GB    1305011      1/1973
(Continued)

OTHER PUBLICATIONS

European Search Report for European Application No. 09 77 3057 completed Jan. 9, 2012.

(Continued)

*Primary Examiner* — John Lee
(74) *Attorney, Agent, or Firm* — Dorsey & Whitney LLP

(57) ABSTRACT

A number of apparatuses are provided, for sensing and/or emitting energy along one or more desired apparatus line of sights (LOS) with respect to the respective apparatus. In an embodiment, an apparatus includes an assembly that is rotatably mounted on a base with respect to a switching axis. The assembly has two or more sensing/emitting units, each having a respective sensing/emitting unit line of sight (ULOS). Each sensing/emitting unit has an operative state, wherein the respective unit ULOS is pointed along a LOS of the apparatus for sensing and/or emitting energy along the LOS, and a corresponding inoperative state, where the respective unit ULOS is pointed along a direction different from this LOS. A switching mechanism enables switching between the sensing/emitting units to selectively bring a desired sensing/emitting unit exclusively into its respective operative state while concurrently bringing a remainder of the sensing/emitting units each to a respective non-operative state.

25 Claims, 5 Drawing Sheets

(51) Int. Cl.
*G01S 7/48* (2006.01)
*G01S 7/481* (2006.01)
*G01S 17/87* (2006.01)
*G01S 17/89* (2006.01)

(56) References Cited

U.S. PATENT DOCUMENTS

| | | | |
|---|---|---|---|
| 5,134,409 | A | 7/1992 | De Groot |
| 5,539,411 | A | 7/1996 | Yu et al. |
| 5,796,474 | A | 8/1998 | Squire et al. |
| 6,057,915 | A | 5/2000 | Squire et al. |
| 6,064,330 | A * | 5/2000 | Elliott et al. ............. 342/54 |
| 6,193,188 | B1 | 2/2001 | Ahmad et al. |
| 6,262,800 | B1 | 7/2001 | Minor |
| 6,359,681 | B1 | 3/2002 | Housand et al. |
| 6,359,833 | B1 | 3/2002 | English |
| 6,484,619 | B1 | 11/2002 | Thomas et al. |
| 6,879,419 | B2 | 4/2005 | Richman et al. |
| 7,009,752 | B1 | 3/2006 | Lorell et al. |
| 7,136,726 | B2 | 11/2006 | Greenfeld et al. |
| 8,330,646 | B2 * | 12/2012 | Baumatz ............. 342/62 |
| 8,791,852 | B2 * | 7/2014 | Adams et al. ............. 342/22 |
| 2006/0132753 | A1 * | 6/2006 | Nichols et al. ............. 356/5.07 |
| 2006/0139204 | A1 * | 6/2006 | Abe et al. ............. 342/52 |
| 2007/0001822 | A1 * | 1/2007 | Haug ............. 340/384.1 |
| 2007/0018879 | A1 | 1/2007 | Batten et al. |
| 2007/0129853 | A1 | 6/2007 | Greenfeld et al. |
| 2007/0146195 | A1 | 6/2007 | Wallenberg et al. |
| 2008/0002176 | A1 * | 1/2008 | Krasutsky ............. 356/4.01 |
| 2008/0059015 | A1 * | 3/2008 | Whittaker et al. ............. 701/23 |
| 2010/0141503 | A1 | 6/2010 | Baumatz et al. |
| 2010/0175573 | A1 * | 7/2010 | Cornett et al. ............. 102/201 |
| 2011/0127328 | A1 * | 6/2011 | Warren ............. 235/412 |
| 2013/0092852 | A1 * | 4/2013 | Baumatz ............. 250/578.1 |

FOREIGN PATENT DOCUMENTS

| | | |
|---|---|---|
| WO | 93/13931 | 5/1996 |
| WO | 96/13931 | 5/1996 |
| WO | 2010001402 | 1/2010 |

OTHER PUBLICATIONS

International Search Report for International Application No. PCT/IL2009/000663 mailed Oct. 22, 2009.
U.S. Appl. No. 12/452,440, Dec. 21, 2011, Non Final Office Action.
U.S. Appl. No. 12/452,440, Aug. 27, 2012, Notice of Allowance and Fees Due.
U.S. Appl. No. 12/452,440, Nov. 21, 2012, Issue Notification.

* cited by examiner

SENSING/EMITTING APPARATUS, SYSTEM AND METHOD

CROSS-REFERENCE TO RELATED APPLICATIONS

This application is a continuation of U.S. patent application Ser. No. 12/452,440 filed on 30 Dec. 2009, which is a U.S. Nationalization of PCT International Application No. PCT/IL2009/000663 filed on 2 Jul. 2009, which claims priority to Israel Application No. 192601 filed on 3 Jul. 2008, the contents of each of the foregoing applications incorporated herein, in their entirety, by this reference.

TECHNICAL FIELD

Embodiments of the invention relate to sensing apparatuses and energy emitting apparatuses, in particular with respect to a remote location, and to systems and methods associated with such apparatuses.

BACKGROUND

Sensor devices and energy emitting devices are well known tools, used for example in aircraft or missiles for detecting, tracking and/or homing onto a target. Such devices often include electro-optical sensors, radar and the like.

There are many known applications where different types of sensors are used with airborne platforms, and the sensors are commonly configured for simultaneous operation through a common aperture. In some such systems having a plurality of electro-optical sensors, some including laser radar or other optical elements, a system of mirrors or other optical components may be used for enabling each of the sensors to look through the common aperture at the same time, or at alternating periods via a movable mirror arrangement, for example. Applications are also known having separate dedicated sensors, including a radar system and an electro-optical sensor for example, in which a different part of the available aperture is assigned to each of the sensors. In yet other applications, each sensor may be configured and mounted to an aircraft, for example, as a separate and independent sensor system.

By way of general background, the following patents provide examples of sensor systems.

U.S. Pat. No. 6,262,800 is directed to a method and apparatus for guiding a weapon to a target using an optical seeker having dual semi-active laser (SAL) and laser radar (LADAR) modes of operation. The seeker further includes a high speed sighting mirror for switching between modes to guide the weapon to the target.

U.S. Pat. No. 6,193,188 discloses a missile including a fuselage with a roll axis and a nod axis perpendicular to the roll axis, and a conformal window mounted to a forward-facing end of the fuselage. There is a sensor system with a field of regard through the window and a line of sight, and a sensor system pointing mechanism affixed to the airframe and upon which the sensor system is supported. A linear translational mechanism is operable to translate the sensor system away from the window with increasing angular deviation of the line of sight of the sensor system from the roll axis.

U.S. Pat. No. 5,134,409 relates to a surveillance sensor provided with at least one surveillance radar antenna and at least one co-located and co-rotating electro-optical surveillance sensor mechanically connected to said radar antenna. A combined panoramic picture is compiled by combining information from both sensors using a common track unit.

U.S. Pat. No. 7,136,726 discloses an airborne reconnaissance system comprising: gimbals having at least two degrees of freedom; at least one array of light sensors positioned on the gimbals, for being directed by the same within at least two degrees of freedom; map storage means for storing at least one Digital Elevation Map of an area of interest, divided into portions; Inertial Navigation System for real-time providing to a gimbals control unit navigation and orientation data of the aircraft with respect to a predefined global axes system; portion selection unit for selecting, one at a time, another area portion from the area of interest; and servo means for directing the gimbals. The system uses data from the inertial navigation system and from the digital elevation map for real-time calculating direction to selected area portions, and for maintaining the direction during integration of light from the terrain, and for producing corresponding images of area portions.

U.S. Pat. No. 6,484,619 discloses an observation or aiming system for a self-propelled vehicle, and includes a post pivoting about a bearing axis relative to the vehicle. The post carries a body for an optical block and a thermal camera which are mounted to pivot about an elevation axis perpendicular to the bearing axis. The system also includes a radar channel having a radar transmitter unit mounted on the body, a radar detection unit mounted on the body close to the bearing axis and concentration means situated in the body for concentrating radar waves on the radar detection unit. The optical block, the thermal camera, and the radar channel are secured so as to always have the same orientation in elevation and in bearing, and thus the same observation direction U.S. Pat. Nos. 5,796,474 and 6,057,915 disclose a projectile tracking system for acquiring and precisely tracking a projectile in flight in order to reveal the source from which the projectile was fired. A telescope focuses infrared light from a relatively large field of view on to an infrared focal plane array. In a projectile detection mode, the system searches for the infrared signature of the fast moving projectile. The telescope's field of view is steered in the azimuth by a step and stare mirror, and when a projectile is detected the system switches to a tracking mode and the mirror is steered to track the projectile. A short pulse high repetition rate laser in a laser radar system provides a pulsed laser beam which is optically coaligned with the telescope axis. Mirror angular position information, laser radar pulse travel time and the missile spot position on detector array are used by a computer to calculate bullet trajectory information and to determine the source or origin of the projectile using known ballistic trajectory methods.

SUMMARY

According to at least some aspects of the invention, an apparatus is provided for at least one of sensing and emitting energy along at least one desired apparatus line of sight (LOS) with respect to said apparatus.

According to a first aspect of the invention, an apparatus is provided for at least one of sensing and emitting energy along a desired apparatus line of sight (LOS) with respect to said apparatus, comprising:

an assembly rotatably mounted on a base with respect to a switching axis, said assembly comprising at least two sensing/emitting units, each said sensing/emitting unit adapted for at least one of sensing and emitting energy along a respective sensing/emitting unit line of sight (ULOS), each said sensing/emitting unit having an operative state, wherein the respective unit ULOS is pointed along said apparatus LOS for at least one of sensing and emitting energy along said LOS, and a corresponding inoperative state, where the respective unit ULOS is pointed along a direction different from said apparatus LOS;

a switching mechanism for rotatably switching between said sensing/emitting units with respect to said switching axis to selectively bring a desired said sensing/emitting unit exclusively into its respective operative state while concurrently bringing a remainder of said sensing/emitting units each to a respective non-operative state, said assembly being configured for being accommodated within a predefined envelope having a maximum dimensional constraint associated with the switching axis, wherein said sensing/emitting units are configured for being enclosed within said envelope in a compact arrangement wherein said respective ULOS are arranged to each point in different directions one from another, and wherein at least one said sensing/emitting unit is configured to provide optimal operation with respect to said maximum width dimension in its operative state while substantially avoiding interference with operation of each one of a remainder of said sensing/emitting units when the latter is in its respective operative state.

In at least some embodiments, the ULOS are angularly displaced from one another, and the switching mechanism is configured for selectively rotating the assembly through a discrete angular displacement corresponding to the angular displacement between a sensing/emitting unit that is currently in its operative state and a sensing/emitting unit that it is desired to bring to its operative state.

According to this and other aspects of the invention, the apparatus may be configured for providing one or more of surveillance, viewing, locating, sighting, detection, recognition, identification, tracking, targeting, marking, homing, tracking and imaging of a target, and provides corresponding data. For example, data may be provided pertaining to surveillance, for example detection data may be provided (for example range and azimuth/elevation of a detected target), recognition data (for example imaging data that enables a target to be recognized—for example a geometric profile, or a heat signature, and so on, that is particular to a type of target), identification data (for example data that enable a target to be identified (for example visual data such as identification markings, symbols and so on), tracking data (for example, position and trajectory of a moving target), targeting data (for example for use in fire control) example.

According to at least the first aspect of the invention, the operation of at least one sensing/emitting unit may be optimized such as to provide the best sensing and/or emission performance for the given dimensional constraint associated with the envelope in which the sensing/emitting units are each to be accommodated in the envelope for their full range of operations, with little or no adverse influence or interference regarding the operation of the other sensing/emitting units. In other words, at least one sensing/emitting unit may be configured for providing optimal performance, as may be possible given the particular dimensional constraints defined by the envelope, in a substantially similar manner to what the case would be with a corresponding apparatus that only comprises the respective sensing/emitting unit.

According to this aspect of the invention, the apparatus may optionally further comprise one or more of the following features, in any desired combination:

(A) The said maximum dimensional constraint comprises a maximum width dimension of the envelope (which is a geometrical envelope), located generally coaxial with said switching axis, i.e. parallel to the switching axis, and at or close to the switching axis. Additionally or alternatively, said maximum dimensional constraint comprises a maximum cross-sectional area of the envelope located on a plane generally aligned with said switching axis, and this plane may be generally orthogonal to the LOS, for example when the LOS is pointing in a particular direction—such a dimensional constraint may be of particular relevance when the apparatus is to be mounted to a standard size pod or the like, and/or when it is desired to maintain a particular frontal area for minimizing drag, for example.

(B) The said envelope may comprise a generally spherical volume, having a diameter thereof substantially coaxial with said switching axis, and having another diameter thereof substantially coaxial with said apparatus LOS.

(C) The aforesaid dimensional constraint may be a physical limitation relating to the size and/or shape of the apparatus, and may include one or more of a one dimensional (linear), two dimensional (area) or three dimensional (volume) constraint related to the apparatus. Given a particular base configuration for mounting the assembly thereonto, the aforesaid physical limitations translate to a corresponding space constraint for the assembly itself. For example, the size of the apparatus may need to be kept within a particular geometric envelope to allow compatibility and/or retrofitability with respect to a particular standard pod size, and/or with respect to a particular off the shelf pointing mechanism, for example, or for other airborne applications in which it is desired to minimize drag and thus maintain the cross-sectional normal to the airflow and external exposed area to a minimum. The dimensional constraint may comprise, for example a linear dimension of said apparatus taken in a plane substantially orthogonal to said LOS, such as for example a diameter of the housing that may accommodate the sensing/emitting units, such as to fit within a radome, fairing, or the like, for example, while allowing the assembly housing to be pointed in any direction within the radome or fairing, in the associated field of regard (FOR). A field of regard is taken herein to refer to a spatial envelope around the apparatus in which it is possible to direct the LOS of the sighting apparatus without obscuration from the apparatus itself or in some cases from structures onto which the apparatus may be mounted.

(D) The said sensing/emitting units are mechanically coupled and may be accommodated within a housing, said housing defining said envelope. For example, the said dimensional constraint may comprise an internal volume of said housing, the dimensional constraint being a three-dimensional constraint. Optionally, the housing may be generally spherical, or at least provides a generally spherical internal volume in which the sensing/emitting units are accommodated.

(E) The said apparatus defines an apparatus aperture substantially normal to said LOS, said aperture having a width dimension and a length dimension, wherein at least one of said width dimension and said length dimension is not greater than said maximum width dimension. In at least some embodiments, each one of said width dimension and said length dimension is not greater than said maximum width dimension.

(F) At least one said sensing/emitting unit comprises a respective sensing/emitting unit aperture for one of sensing and transmitting energy therethrough, wherein operation of the or each said sensing/emitting unit is a function of said respective aperture of the sensing/emitting unit, and wherein said respective aperture has a value optimized with respect to said apparatus aperture. In other words the respective aperture of the sensing/emitting unit may be dimensionally matched to, or approach as much as possible, the apparatus aperture. For example, the ratio (or proportion) of the linear dimension (i.e., a diameter or width) of the aperture of the unit to the corresponding linear dimension of the apparatus aperture, may include, in at least some embodiments of the invention, any one of the following ranges: 0.5 to 0.6; 0.6 to 0.7; 0.7 to 0.8; 0.8 to 0.85; 0.8 to 0.9; 0.85 to 0.9; 0.85 to 0.95; 0.9 to 0.95; 0.9 to 0.98; 0.95 to 0.98; 0.95 to 1.0; 0.9 to 1.0. Additionally or alternatively, the ratio or proportion of the area dimension of the aperture of the unit to the corresponding area dimension of the apparatus aperture may include, in at least some embodiments of the invention, any one of the following ranges: 0.5 to 0.6; 0.6 to 0.7; 0.7 to 0.8; 0.8 to 0.85; 0.8 to 0.9; 0.85 to 0.9; 0.85 to 0.95; 0.9 to 0.95; 0.9 to 0.98; 0.95 to 0.98; 0.95 to 1.0; 0.9 to 1.0.

(G) Each said sensing/emitting unit comprises a respective sensing/emitting unit aperture for one of sensing and transmitting energy therethrough, wherein in said operative state the respective unit aperture exclusively is comprised within said apparatus aperture. In embodiments where the assembly is accommodated in a housing, the housing may comprise at least one opening aligned with each said sensing/emitting unit, optionally fitted with a window made from a material transparent to electromagnetic radiation at least within the range of operation of the respective sensing/emitting unit having its ULOS aligned therewith. The size of the window is matched to, or is greater than, the aperture of the respective sensing/emitting unit.

(H) In at least some embodiments, the said sensed or emitted energy is electromagnetic (EM) energy, in any desired wavelength range. For example, for at least some of the sensing/emitting units, the EM energy may be in optical wavelengths (optionally including IR and/or UV wavelengths), while for others the EM energy may be in radar wavelengths (e.g., X-band), while yet for other sensing/emitting units the EM energy may be in the microwave range.

(I) The plurality of sensing/emitting units are mechanically coupled so that they may rotate together about the switching axis, or switched in any other suitable manner with respect to the apparatus LOS, as a single unit. The various sensing/emitting units may be directly coupled to one another mechanically, or indirectly so—for example, the sensing/emitting unit may be separately coupled to a common housing. Optionally, one or more said sensing/emitting units may be configured for locally varying the direction of its ULOS, for example by means of rotational drives, to provide one or two degrees of freedom for the or each respective sensing/emitting unit. In such cases, the movement envelope of the individual sensing/emitting unit may be restricted by the apparatus aperture, for example as provided by a window of the like in the housing.

(J) In at least some embodiments, at least one of the said sensed or emitted energy for at least one said sensing/emitting unit is not EM energy, and comprises other forms of energy, for example acoustic energy and/or radioactive radiation.

(K) Each said sensing/emitting unit may be configured for operating along said LOS continuously when said respective ULOS is aligned to point along said LOS.

(L) The apparatus may be configured for fixedly maintaining the alignment between a sensing/emitting unit ULOS and the LOS during operation of the respective sensing/emitting unit.

(M) In at least some embodiments, the said at least two sensing/emitting units comprise a first said sensing/emitting unit and a second said sensing/emitting unit. The said first sensing/emitting unit may be operable for at least one of detecting and recognizing a target at a distance between said target and said apparatus greater than a first distance, and wherein said second sensing/emitting unit is operable for at least one of identifying and recognizing said target at a distance between said target and said apparatus at or less than said first distance. Alternatively, said first sensing/emitting unit is configured for at least one of sensing and emitting energy within a maximum second distance therefrom, and wherein said second sensing/emitting unit is configured for at least one of sensing and emitting energy within a maximum said first distance therefrom, said first distance being significantly greater than said second distance. In some embodiments, the said second distance may each be one or more of: about 100 km; about 80 km or about 60 km, and said first distance may be for example less than about 20 km; less than about 15 km; less than about 10 km; less than about 5 km.

(N) The ULOS for each of the said first and second sensing/emitting units generally have different directions with respect to one another, and in some embodiments these axes may intersect. In at least some embodiments, each said ULOS may lie on a plane substantially orthogonal to the switching axis.

(O) One or more of the said sensing/emitting unit may be configured as a sensing unit, for passively sensing energy, for example EM energy, and may comprise, for example, optical or SIGINT modules for respectively sensing optical EM radiation (optionally including IR and/or UV radiation) or radar wavelength EM radiation.

(P) One or more of the said sensing/emitting unit may be configured as an emitting unit, for actively emitting energy, for example EM energy, and may comprise, for example, countermeasures such as a radar jammer, a radio jammer, a light emitter, and so on.

(Q) One or more of the said sensing/emitting unit may be configured for sensing and emitting energy, for example EM and/or acoustic energy, and may comprise for example radar systems, sonar systems, Ladars and so on.

(R) In some embodiments, said first sensing/emitting unit comprises at least one radar system configured for enabling detecting a target along its respective ULOS. In some variations of these embodiments, said first sensing/emitting unit comprises a first conformal radar antenna substantially conformal with a first portion of an imaginary surface defining said envelope, for example a spherical surface. Where the envelope encloses a generally spherical volume, the radar antenna may be in the shape of a hemisphere or close thereto, for example.

(S) In some embodiments, the said second sensing/emitting unit comprises at least one electro-optical device. The said second sensing/emitting unit is configured for at least one of: enabling providing images in at least one of the visible, infra red and ultraviolet electromagnetic spectrum; night vision; enabling providing pulsed laser designator for targeting; enabling any suitable form of thermal imaging.

(T) In some embodiments, the said first sensing/emitting unit comprises a first said radar system having a first ULOS and said second sensing/emitting unit comprising said electro-optical system having a second ULOS, wherein said first and second ULOS are angularly displaced one from the other with respect to said switching axis. At least some of these embodiments may further comprise a plurality of sensing/emitting units, including a third sensing/emitting unit in the form of a second said radar system, for example having a third ULOS in a direction substantially opposed to that of said first ULOS, for example. Optionally, each one of the said first and second radar systems comprises a conformal radar antenna substantially conformal with a portion of a surface defining said envelope, for example a spherical surface.

(U) Thus, the third ULOS may be substantially co-axial with but opposite in direction to said first ULOS, but in alternative embodiments may be co-axial with but opposite in direction to the second ULOS, or indeed at any suitable angular relationship with respect to the first and/or second ULOS's. Alternatively, the third sensing/emitting unit may comprise a regular radar antenna housed within an apparatus housing, together with the other said sensing/emitting units. Alternatively, the third sensing/emitting unit may comprise one or more electro-optic devices, including for example any suitable image acquisition device or the like. Additionally, the apparatus may further comprise a fourth or more additional said sensing/emitting units, each having its respective ULOS, which may be disposed at any suitable angular relationship with respect to the first, second and third ULOS's. In one embodiment comprising a plurality of said sighting units mechanically coupled to form an assembly, each sensing/emitting unit is arranged to have is ULOS radially projecting from a common center, such as the center of gravity and/or geometrical center of the assembly, for example, and lying on a common plane, for example; alternatively, at least some sensing/emitting units may be comprised on different, parallel planes, and each has its respective ULOS radially projecting from a common switching axis, transverse to the sighting axes, passing through the center of gravity and/or geometrical center of the assembly, for example.

(V) In at least some applications of the invention, the apparatus is used first to detect and possibly recognize a target. One said sensing/emitting unit is configured for this purpose, and may comprise a Radar system, for example a SAR radar. Once the target has been detected, this is followed by optionally recognizing the target, and identifying the target, using a sensing/emitting unit in the form of an electro-optical sensing unit. Then, optionally, the type of target may be determined, for example via ESM, COMINT or ELINT, wherein for example it may be possible to distinguish a fire control vehicle (which transmits a relative high volume of radio signals) from other vehicles which may nevertheless appear visually or otherwise similar, and this may be performed by a sensing/emitting unit having ESM, COMINT or ELINT detection capabilities, and configured for detecting and interpreting ESM, COMINT or ELINT signals emitted by the target. (It is to be noted that such a ESM, COMINT or ELINT-capable sensing/emitting unit may be used initially for detecting whether or not such an active target exists, and when detected, the system switches to the radar system to actually detect the same, followed by recognition, and identification of the target, etc.) Subsequently, a sensing/emitting unit configured for targeting a target, for example comprising a laser designator is switched to point its ULOS along the system LOS for eventually acquiring the target. Optionally, a sensing/emitting unit comprising a radar jammer or the like may be used for jamming or otherwise electronically incapacitating a target. The aforesaid functions may each be performed by a separate sensing/emitting unit, all of which are mechanically coupled with respect to the switching axis, or alternatively, at least some of the functions may be carried out by a single sensing/emitting unit which comprises the various devices. In other applications it may be desired to provide optical surveillance of a particular area, and the assembly may switch, for example, between an electro-optical unit having a wide angle field of view, to another electro-optical sensing/emitting unit having a narrower filed of view, but better resolution, as desired by the operator.

(W) In at least some embodiments the apparatus is configured for being statically mounted to a vehicle or a structure. In some embodiments, the apparatus may be configured to provide one fixed line of sight, and each sensing/emitting unit may be individually and separately aligned to point along the line of sight as desired. Such embodiments may find particular use in static applications, for example on a stationary ground vehicle or static structure, for detecting airborne threats for example—first a radar based sensing/emitting unit detects a possible incoming target (or threat), and the apparatus switches to a visual-based sensing/emitting system for identifying the target. Optionally, there may be provided an internal gimbals mechanism for locally varying the direction of the ULOS of the respective sensing/emitting unit that is in its operative state and is thus aligned along the apparatus LOS, to thus enable the apparatus LOS to be selectively pointed in any desired direction.

(X) In at least some embodiments, the apparatus may be configured for providing a line of sight having one degree of freedom, in which the line of sight may be pointed in any direction on a plane, within the limits of a FOR, the plane being normal to the switching axis. Thus, the switching mechanism may be adapted for pointing one or another of the sensing/emitting units at a particular LOS, the direction of the LOS being selectively changeable within such a FOR by pivoting about the switching axis. Additionally or alternatively, there may be provided an internal gimbals mechanism for locally varying the direction of the ULOS of the respective sensing/emitting unit that is in its operative state and is thus aligned along the apparatus LOS, to thus enable the apparatus LOS to be selectively pointed in any desired direction.

(Y) In at least some embodiments, the apparatus further comprises a suitable pointing mechanism, configured for enabling selectively defining said LOS in a desired direction at least within a field of regard (FOR), enabling a said sensing/emitting unit aligned with said LOS to be selectively pointed in said desired direction therewith. The FOR may be in three-dimensional space. For example, said pointing mechanism comprises a pan and tilt mechanism, or any other suitable gimbals system, and in any case suitable servo means may optionally be provided for directing the pan and tilt mechanism or gimbals. Additionally or alternatively, there may be provided an internal gimbals mechanism for locally varying the direction of the ULOS of the respective sensing/emitting unit that is in its operative state and is thus aligned along the apparatus LOS, to thus enable the apparatus LOS to be selectively pointed in any desired direction.

(Z) Each said sensing/emitting unit may be configured for providing data associated with at least one of surveillance, viewing, locating, sighting, detection, recognition, identification, targeting, marking, homing, tracking and imaging of a target.

According to the first aspect of the invention, a system is also provided for at least one of sensing and emitting energy along a desired line of sight (LOS) comprising said apparatus as defined above, and optionally comprising any combination of features (A) to (Z), and further comprising a controller for controlling operation of said apparatus.

According to this aspect of the invention, the apparatus may optionally further comprise one or more of the following features, in any desired combination:

(a) The said system may be further configured for selective switching from aligning a ULOS of one said sensing/emitting unit with said LOS to aligning a ULOS of another said sensing/emitting unit with said LOS according to predetermined criteria. For example, said switching may be manual switching. Additionally or alternatively, for example, the system may be configured for aligning a first said sensing/emitting unit to point its respective ULOS along said LOS when a distance between a desired target and said system along said LOS is greater than a first distance, and wherein said system is further configured for automatically switching to aligning the respective ULOS of a second said sensing/emitting unit with said LOS when said distance is not greater than said first distance. Additionally or alternatively, for example, switching may occur after the first sensing/emitting unit has detected the presence of a target, and the second sensing/emitting unit is in its operative state thereafter until, at least, the target comes into the range of the second sensing/emitting unit.

(b) Thus, for example, the system may be configured for enabling a target to be detected at a relatively large distance from the system, and in a relatively simple, responsive and effective manner, for example by using a suitable radar system as the first sensing/emitting unit. In other words, whether or not there is a target may be established by means of the first sensing/emitting unit. Optionally, and in some embodiments, the target may also be recognized, for example when using a SAR radar, and thus it may be possible using the first sensing/emitting unit to also determine what type of target it is—for example, whether it is a tank as opposed to a car, or a bus as opposed to a lorry, for example. On the other hand, and once the distance to the target is reduced, the second sensing/emitting unit takes over the surveillance via the switching mechanism, and may optionally first provide recognition of the target using the optical (optionally including IR and/or UV) system or the like, which can confirm or enhance the recognition previously determined by the SAR or the like, or may provide the first instance of recognition when the first sensing/emitting unit is only configured for detection. Furthermore, the second sensing/emitting unit can then be used for identifying the target, which may often be the case can only be done by examining the optical properties, in particular colors, markings, emblems etc that are on the target, in which case a radar type sensing/emitting unit is less useful. On the other hand, an optical-based sensing/emitting unit can distinguish such optical properties, particularly at the closer range. Once the target is identified and located, further action may be taken, for example homing, tracking, fire control options, and so on.

(c) Optionally, the system may be configured for tracking the target during operation of one or another or all of said sensing/emitting units. For example, any suitable gyrostabilized mechanism may be employed for maintaining the direction of the LOS stabilized regardless of movement of the system itself.

(d) The said switching may be effected during a time interval, and system may be further configured for receiving data regarding a position, orientation and trajectory of the system, at least during said time interval, and for using said data for enabling pointing said LOS along a same direction after switching as just before said switching. For example the finite time interval may be a fraction of a second. In any case, during that interval, the system may have moved in relation to the target. For example, the system may comprise GPS and velocity and acceleration sensors, operationally connected to a suitable computer, which determines from this data and from the direction of the LOS according to a common system of coordinates, for example a global system of coordinates, where the new position of the system is after the time interval, and what the new direction for the LOS needs to be from this position in order to still be pointing at the same target as before. This new direction can be effectively translated into the local coordinate system of the pointing mechanism, so as to direct the pointing mechanism to point at the same target when the second sensing/emitting unit is aligned with the LOS. Optionally, a DTM (digital terrain map) may be pre-loaded in the computer, to further clarify the position of the target vis-à-vis the position of the system. Thus, the system can ensure that the effective line of sight to a particular target is maintained during the transition between one sensing/emitting unit and another sensing/emitting unit. This may be of particular use where the target is static or moving slowly, i.e. has a small displacement relative to the aforesaid time interval.

(e) The said system may be further configured for determining a trajectory of a target being tracked by said first sensing/emitting unit, and for projecting a probable location of the target with respect to said system during said time interval based on said trajectory and on said data, and for compensating the direction of said LOS based on said probable location. Thus, the system may be further configured also for compensating for the movement of the target itself during the transition.

(f) The said system may further comprise a pod (which includes any type of detachable container), or any other suitable payload structure configured for being attachable to an air vehicle, sea-faring vehicle, space vehicle, road vehicle or any other movable platform, wherein at least said apparatus is configured for being housed in the pod or the like. For example, the pod may be of general elongate cylindrical construction comprising the apparatus at one longitudinal end thereof, and further comprise suitable lugs for attachment to a carrier aircraft, for example, by means of standard attachment points. The pod or other said payload structure may be mounted externally to the fuselage or wings of an air vehicle, typically though not limited to, below the same. In some embodiments, the pod is a standard size pod, for example nominal diameter 40 cm, and this diameter determines the dimensional constraint of the geometric envelope.

(g) For example, the system may be adapted for use in fighter aircraft or the like, for example, and may also be suitable for use in other airborne platforms, such as for example UAV's, cargo aircraft and so on.

According to the first aspect of the invention, the sensor/emitter units are enclosed in a restricted space or volume, referred to herein as an envelope or as a geometrical envelope, and are configured to maximize use of the volume, by angularly offsetting the individual unit LOS (ULOS) from one another with respect to the switching axis, and making use of the switching feature that mechanically brings the full aperture of each unit, exclusively, in line with the desired apparatus LOS. This enables the aperture of at least one of the units to be maximized while not overlapping or interfering with the aperture of the other units, and to thus optimize operation of the unit while not interfering with operation of the other unit(s).

In embodiments in which the apparatus comprises a pan and tilt mechanism, a spherical geometrical envelope is a useful feature associated with the feature of being able to have the assembly rotate about an axis normal to the switching axis (i.e., rotation about the pod axis, when the apparatus is mounted to a pod for example), to give it one of its degrees of freedom while a "gimbal" rotation about the switching axis provides the second degree of freedom. At the same time this envelope profile does not effectively change the frontal area of the apparatus to exceed that of the pod, which is also an aerodynamic feature.

According to a second aspect of the invention, an apparatus is provided for at least one of sensing and emitting energy along a desired discrete apparatus line of sight (LOS) with respect to said apparatus, comprising at least two sensing/emitting units, each said sensing/emitting unit adapted for at least one of sensing and emitting energy along a respective unit line of sight (ULOS) via a respective sensing/emitting unit aperture, said sensing/emitting units being mechanically coupled;

each sensing/emitting unit having an operative state, wherein the respective ULOS is pointed continuously along said LOS for at least one of sensing and emitting energy, and a corresponding inoperative state, where the respective unit operating axis is pointed along a direction different from said LOS;

a switching mechanism for switching between said sensing/emitting units to selectively bring a desired sensing/emitting unit exclusively into its respective operative state while concurrently bringing a remainder of said sensing/emitting units each to a respective non-operative state.

According to the second aspect of the invention, which thus provides a stop and stare capability for sensing and/or emitting energy along a desired apparatus LOS, at least one said sensing/emitting unit may also be configured for providing optimal operation with respect to a dimensional constraint of the apparatus and along said LOS independently of the other said sensing/emitting unit(s), and the sensing/emitting units may be comprised in an assembly, rotatable about a switching axis, substantially as disclosed above for the first aspect of the invention, mutatis mutandis.

Furthermore, the apparatus according to the second aspect of the invention may optionally further comprise one or more of the features (A) to (Z) disclosed above for the first aspect of the invention, mutatis mutandis, in any suitable combination.

According to the second aspect of the invention, a system is also provided for at least one of sensing and emitting energy along a desired line of sight (LOS) comprising said apparatus as defined above according to the second aspect of the invention, mutatis mutandis, and further comprises a controller for controlling operation of said apparatus, and may optionally further comprise one or more of the features (a) to (g) disclosed above for the system according to the first aspect of the invention, mutatis mutandis, in any suitable combination, as applied to the apparatus according to the second aspect of the invention, mutatis mutandis.

According to the second aspect of the invention, a method is also provided for at least one of sensing and emitting energy along an apparatus line of sight (LOS) with respect to a target, comprising selectively aligning a sensing/emitting unit line of sight (ULOS) of a first sensing/emitting unit with said LOS and one of sensing and emitting energy continuously along said LOS with said first sensing/emitting unit, and further comprising selectively switching to aligning a ULOS of a second sensing/emitting unit along said LOS and one of sensing and emitting energy continuously along said LOS with said second sensing/emitting unit, wherein said first sensing/emitting unit and said second sensing/emitting unit are mechanically coupled.

The method according to the second aspect of the invention may be carried out using the apparatus and/or system as disclosed herein according to the second aspect of the invention, and may comprise additional corresponding method steps.

According to the second aspect of the invention, the LOS of the apparatus may be pointed in one desired direction and kept there, and the particular sensing/emitting unit aligned with the LOS, as desired, enabling the apparatus to operate as a staring or tracking apparatus, for example. In embodiments comprising a pan and tilt mechanism, which are functionally and/or structurally different from the switching mechanism (in this and other aspects of the invention), pan and tilt feature allows the LOS to be pointed in other directions, enabling the apparatus to operate as a surveillance apparatus, for example.

According to a third aspect of the invention, there is provided an apparatus for at least one of sensing and emitting energy along a desired apparatus line of sight (LOS) with respect to said apparatus, comprising:

at least two sensing/emitting units, each said unit adapted for at least one of sensing and emitting energy along a respective sensing/emitting unit line of sight (ULOS);

each sensing/emitting unit having an operative state, wherein the respective ULOS is pointed along said LOS for at least one of sensing and emitting energy, and a corresponding inoperative state, where the respective ULOS is pointed along a direction different from said LOS;

a switching mechanism for switching between said sensing/emitting units to selectively bring a desired said sensing/emitting unit exclusively into its respective operative state while bringing a remainder of said sensing/emitting units each to a respective non-operative state; and wherein said apparatus is configured for selectively changing a direction of said LOS, during operation of the apparatus, with respect to at least two degrees of freedom when each one of said units is exclusively in its operative state, i.e., independently of which one of said units is exclusively in its operative state.

According to the third aspect of the invention, the direction of the LOS may be selectively changed with respect to at least two degrees of freedom when each one of said units is exclusively in its operative state and is operating to sense and/or emit energy along said LOS. Thus, operation of one or the other respective unit that is in its operative state can proceed while at the same time selectively changing the direction of the LOS in two or more degrees of freedom.

According to the third aspect of the invention, at least one said sensing/emitting unit may also be configured for providing optimal operation with respect to a dimensional constraint of the apparatus and along said LOS independently of the other said sensing/emitting unit(s), and the sensing/emitting units may be comprised in an assembly, rotatable about a switching axis, substantially as disclosed above for the first aspect of the invention, mutatis mutandis. Furthermore, the apparatus according to the third aspect of the invention may optionally further comprise one or more of the features (A) to (Z) disclosed above for the first aspect of the invention, mutatis mutandis, in any suitable combination.

According to the third aspect of the invention, a system is also provided for at least one of sensing and emitting energy along a desired line of sight (LOS) comprising said apparatus as defined above according to the third aspect of the invention, mutatis mutandis, and further comprises a controller for controlling operation of said apparatus, and may optionally further comprise one or more of the features (a) to (g) disclosed above for the system according to the first aspect of the invention, mutatis mutandis, in any suitable combination, as applied to the apparatus according to the third aspect of the invention, mutatis mutandis.

According to a fourth aspect of the invention, there is provided an apparatus for at least one of sensing and emitting energy along an apparatus line of sight (LOS) with respect to said apparatus, comprising (I) at least two sensing/emitting units, each said unit adapted for at least one of sensing and emitting energy along a respective unit line of sight (ULOS);

(II) each sensing/emitting unit having an operative state, wherein the respective ULOS is pointed along said LOS for at least one of sensing and emitting energy, and a corresponding inoperative state, where the ULOS is pointed along a direction different from said LOS;

(III) a switching mechanism for switching between said units to selectively bring a desired unit exclusively into its respective operative state while concurrently bringing a remainder of said units each to a respective non-operative state;

(IV) wherein a first said sensing/emitting unit is configured for at least one of sensing and emitting energy when an operational parameter associated with operation of said device is greater than an operational threshold and wherein a second said sensing/emitting unit is configured for at least one of sensing and emitting energy when said operational parameter is at or less than said operational threshold.

The following features may be provided. For example, the switching mechanism may be configured for automatically and/or reversibly switching between said units to bring said first unit or said second unit into its operative state, respectively, according to whether said operational parameter is greater than or not greater than said operational threshold. For example, the operational parameter includes a distance to said target, and wherein said operational threshold is a first distance. In another example, the operational parameter includes a visibility range along said LOS, and wherein said operational threshold is visibility correlated with adverse weather conditions; for example, the operational threshold may be zero visibility conditions.

Thus, in at least one variation, feature (IV) comprises:

wherein one said sensing/emitting unit is configured for at least one of sensing and emitting energy when a distance to said target greater than a first distance and wherein another said sensing/emitting unit is configured for at least one of sensing and emitting energy when said distance is at or less than said first distance.

In another variation, feature (IV) may be replaced with:

(V) wherein one said sensing/emitting unit is configured for at least one of sensing and emitting energy within a maximum first distance therefrom, and wherein another said sensing/emitting unit is configured for at least one of sensing and emitting energy within a maximum second distance therefrom, said first distance being significantly greater than said second distance.

According to the fourth aspect of the invention, at least one said sensing/emitting unit may also be configured for providing optimal operation with respect to a dimensional constraint of the apparatus and along said LOS independently of the other said sensing/emitting unit(s), and the sensing/emitting units may be comprised in an assembly, rotatable about a switching axis, substantially as disclosed above for the first aspect of the invention, mutatis mutandis. The sensing/emitting units are also mechanically coupled, and each said unit is adapted for at least one of sensing and emitting energy along a respective unit line of sight (ULOS) via a respective sensing/emitting unit aperture.

Furthermore, the apparatus according to the fourth aspect of the invention may optionally further comprise one or more of the features (A) to (Z) disclosed above for the first aspect of the invention, mutatis mutandis, in any suitable combination.

According to the fourth aspect of the invention, a system is also provided for at least one of sensing and emitting energy along a desired line of sight (LOS) comprising said apparatus as defined above according to the second aspect of the invention, mutatis mutandis, and further comprises a controller for controlling operation of said apparatus, and may optionally further comprise one or more of the features (a) to (g) disclosed above for the system according to the first aspect of the invention, mutatis mutandis, in any suitable combination, as applied to the apparatus according to the fourth aspect of the invention, mutatis mutandis.

According to the fourth aspect of the invention, a method is also provided for at least one of sensing and emitting energy along an apparatus line of sight (LOS) with respect to a target, comprising selectively aligning a unit line of sight (ULOS) of a first sensing/emitting unit with said LOS when a distance to said target greater than a first distance (also referred to as a threshold distance), and one of sensing and emitting energy along said LOS with said first sensing/emitting unit, and further comprising switching to aligning a ULOS of a second sensing/emitting unit along said LOS, when said distance is at or less than said first distance, and one of sensing and emitting energy continuously along said LOS with said second sensing/emitting unit, wherein said first sensing/emitting unit and said second sensing/emitting unit are mechanically coupled. The method may further comprise features parallel to those disclosed above for the apparatus according to the fourth aspect of the invention mutatis mutandis.

The method according to the fourth aspect of the invention may be carried out using the apparatus and/or system as disclosed herein according to the fourth aspect of the invention, and may comprise additional corresponding method steps.

According to a fifth aspect of the invention there is provided an apparatus for at least one of sensing and emitting energy concurrently along each of at least two different apparatus lines of sight (LOS) with respect to said apparatus, comprising:

an assembly comprising at least two sensing/emitting units, each said sensing/emitting unit adapted for at least one of sensing and emitting energy along a respective sensing/emitting unit line of sight (ULOS) via a respective sensing/emitting unit aperture, wherein said sensing/emitting units are mechanically coupled;

said assembly having a plurality of operative states, including at least a first operative state wherein at least two ULOS are pointed one each along a respective said LOS for at least one of sensing and emitting energy with respect thereto, and at least a second operative state wherein at least one said ULOS is pointed along a LOS different from the LOS in which it was pointing during said first operative state;

a switching mechanism for switching between said units to selectively bring said assembly into a desired said operative state.

According to the fifth aspect of the invention, at least one said sensing/emitting unit may also be configured for providing optimal operation with respect to a dimensional constraint of the apparatus and along each said apparatus LOS independently of the other said sensing/emitting unit(s), and the sensing/emitting units may be comprised in an assembly, rotatable about a switching axis, substantially as disclosed above for the first aspect of the invention, mutatis mutandis. Furthermore, the apparatus according to the fifth aspect of the invention may optionally further comprise one or more of the features (A) to (Z) disclosed above for the first aspect of the invention, mutatis mutandis, as appropriate, in any suitable combination. According to the fifth aspect of the invention, a system is also provided for at least one of sensing and emitting energy along at least two desired lines of sight (LOS) comprising said apparatus as defined above according to the fifth aspect of the invention, mutatis mutandis, and further comprises a controller for controlling operation of said apparatus, and may optionally further comprise one or more of the features (a) to (g) disclosed above for the system according to the first aspect of the invention, mutatis mutandis, as appropriate in any suitable combination, as applied to the apparatus according to the fifth aspect of the invention, mutatis mutandis.

According to the above or other aspects of the invention, a number of apparatuses are provided, for sensing and/or emitting energy along one or more desired apparatus line of sights (LOS) with respect to the respective apparatus. In at least one embodiment, the apparatus includes an assembly that is rotatably mounted on a base with respect to a switching axis. The assembly has two or more sensing/emitting units, each having a respective sensing/emitting unit line of sight (ULOS). Each sensing/emitting unit has an operative state, wherein the respective unit ULOS is pointed along a LOS of the apparatus for sensing and/or emitting energy along the LOS, and a corresponding inoperative state, where the respective unit ULOS is pointed along a direction different from this LOS. A switching mechanism enables switching between the sensing/emitting units to selectively bring a desired sensing/emitting unit exclusively into its respective operative state while concurrently bringing a remainder of the sensing/emitting units each to a respective non-operative state. Corresponding systems and methods are also provided.

Features of the invention disclosed above for one or more said aspects of the invention may also apply, mutatis mutandis, to one or more other aspects of the invention.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
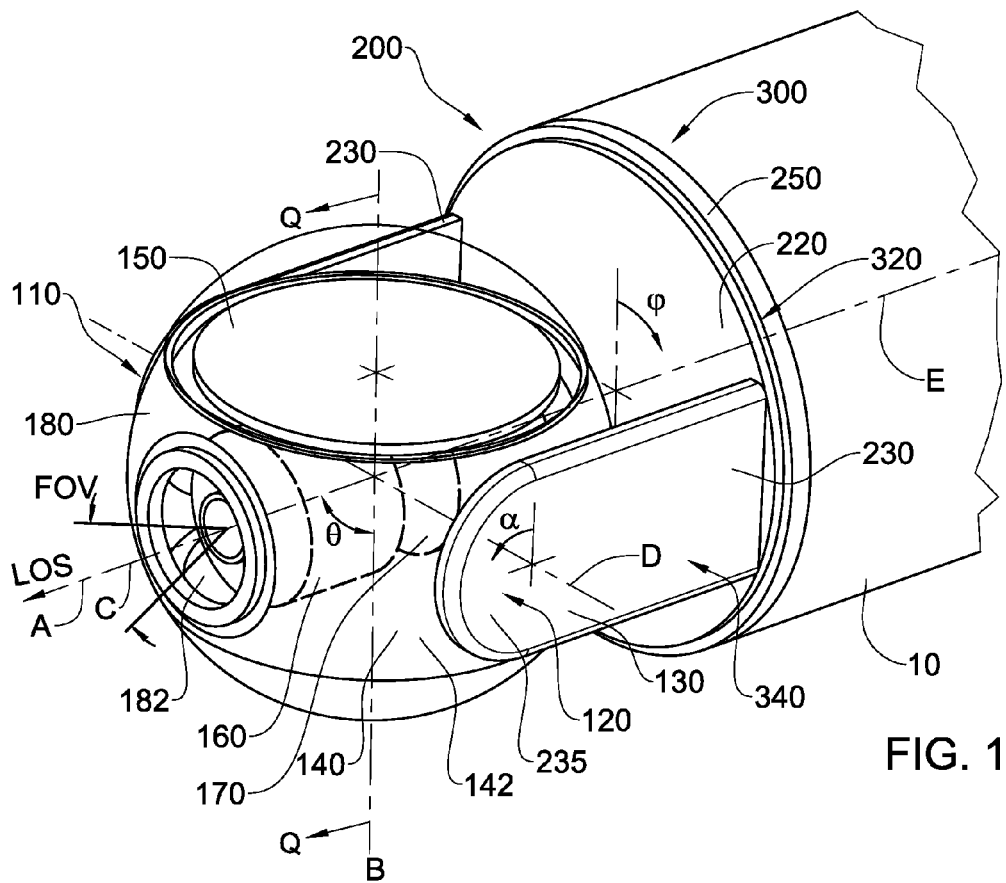
FIG. 1 is an isometric see-through view of a first embodiment of the apparatus of the invention, in which one sensing/emitting unit is aligned with a desired system line of sight.
Figure 2:
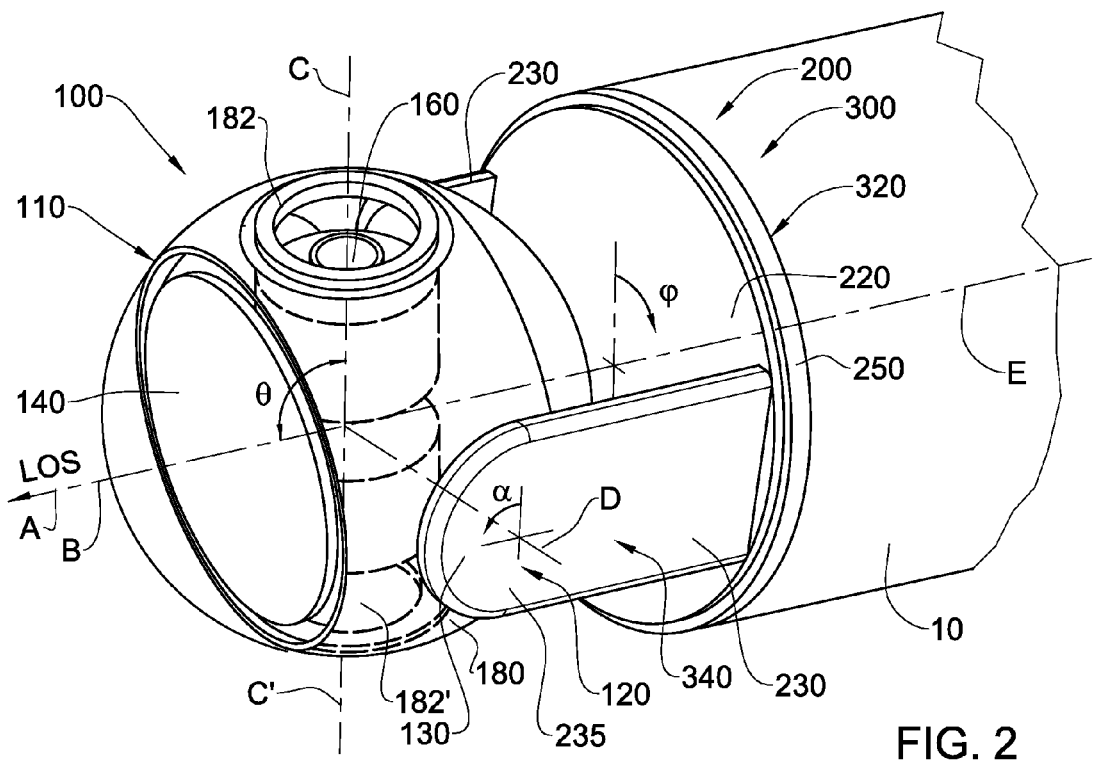
FIG. 2 is an isometric see-through view of the embodiment of FIG. 1, in which another sensing/emitting unit is aligned with a desired system line of sight.

Referring to FIGS. 1 and 2, an apparatus according to a first embodiment of the invention is generally designated with reference numeral 100 and comprises a sensing/emitting assembly 110, and switching mechanism 120.

The sensing/emitting assembly 110 comprises a housing 180, and at least two sensing/emitting units—a first sensing/emitting unit 140, and a second sensing/emitting unit 160. According to one aspect of the invention, the assembly 110, or alternatively the apparatus 100, is configured to be accommodated within a predefined restricted space, also referred to herein as an envelope.

The first sensing/emitting unit 140 is capable of at least one of sensing and emitting energy in a direction along a sensing/emitting unit line of sight (ULOS), also referred to herein as axis B, for respectively sensing/emitting energy, generally with respect to a target. The second sensing/emitting unit 160 is capable at least one of sensing and emitting energy in a direction along a sensing/emitting unit line of sight (ULOS), also referred to herein as axis C, for respectively sensing/emitting energy, generally with respect to the target. As will become clearer herein, while in this specific embodiment the first sensing/emitting unit 140 comprises a radar system for at least sensing electromagnetic energy in radar wavelengths, and the second sensing/emitting unit 160 comprises an electro-optic sensor, for at least sensing electromagnetic energy in optical wavelengths, many different variations of this arrangement may be alternatively provided in corresponding variations of this embodiment.

The sensing/emitting units 140 and 160 are mechanically coupled to one another, and are accommodated in housing 180, which in the illustrated embodiment is generally spherical, having a geometrical center GC. In some variations of this embodiment, the sensing/emitting units 140 and 160 may be effectively coupled to one another indirectly, and/or may be mounted in any suitable manner to a common frame, and/or to housing 180, and in at least some variations of the illustrated embodiment, the center of gravity of the assembly 110 may be at or near the GC.

Axes B and C intersect at, or close to, GC, and are at an angle θ to one another when the axes B and C are viewed from a third axis orthogonal to both axis B and axis C, such as for example rotation axis D (see below). In this embodiment, the axes B, C are in mutual orthogonal relationship with respect to one another, i.e., angle θ is nominally 90°, though in variations of this embodiment, the angle θ between axes B and C may be different from 90°, mutatis mutandis, by way of non-limiting example angle θ may be any one of plus or minus 15°, 30°, 45°, 60°, 75°, 90°, 105°, 120°, 135°, 150°, 165°, 180°, and so on.

The assembly 110 is mounted for rotation to a base on the form of support bracket 200, which comprises two laterally spaced arms 230 that project forwardly from a base member 220, via bearings (not shown) that are located at or near the free ends 235 of spaced arms 230, for enabling selective rotation of the assembly 110 with respect to the bracket 200 about axis D that intersects the GC and passes through the bearings 235. In alternative variations of this embodiment, housing 180 may comprise diametrically opposed journals that are mounted to the respective bearings, the assembly being mounted to the housing.

Figure 5:
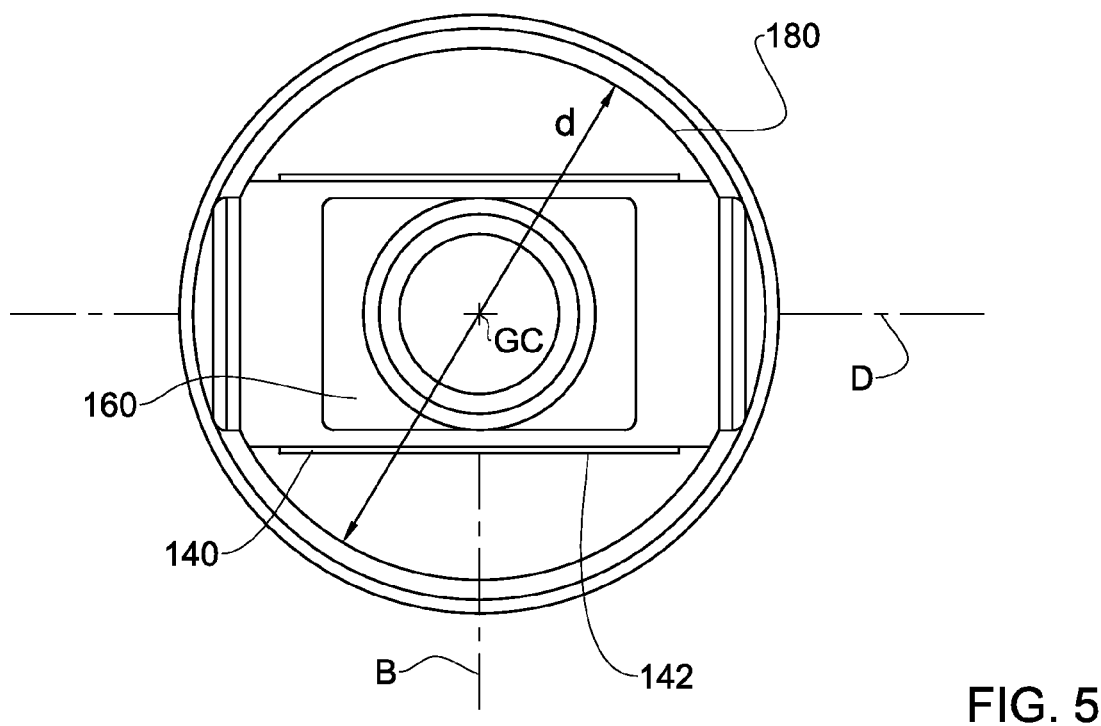
FIG. 5 is a front cross-sectional view of the embodiment of FIG. 1 taken along Q-Q.

Referring also to FIG. 5, in the first embodiment, the first sensing/emitting unit 140 comprises a suitable radar system or the like, having a suitable field of view (FOV) associated with its ULOS (axis B). In at least one variation of this embodiment, the radar system is configured for operating, for example, at electromagnetic wavelengths at least in the X band or greater. The first sensing/emitting unit 140 is thus configured as a sensing and emitting unit for emitting and sensing electromagnetic energy at radar wavelengths, and, for example, the radar system may comprise a radar transmitter/receiver unit configured for emitting and receiving radar signals, such as for example a Synthetic Aperture Radar (SAR) or other suitable radar means capable of detecting a target at a long range distance, for example more than 50 km, for example up to 80 km or up to 100 km, by sensing radar signals returned from the target. The radar unit comprises a disc-shaped, planar array antenna 142, for example, having a diameter which can be optimized to be close to the internal diameter of housing 180, which defines an apparatus aperture at least with respect to the first sensing/emitting unit 140. As may be seen in FIG. 5 the maximum value for the diameter d of the internally accommodated antenna 142 depends on how close to the GC the antenna 142 may be located in assembly 110, which in turn depends on the physical dimensions of the second sensing/emitting unit 160, in particular its width along axis B. The narrower the second sensing/emitting unit 160 along the direction of the first sensing/emitting axis B, the closer the antenna 142 may be situated to the GC, and the larger the diameter thereof can be with respect to the envelope. Accordingly, it is possible for the antenna 142 to have a diameter, and thus an effective aperture, which can be close to the diameter of the housing. By enabling the sensing/emitting unit 140 to have is ULOS exclusively aligned along the system LOS A when thus selected, the effective aperture of the sensing/emitting unit 140, which depends on the effective diameter of the antenna 142 (or projected diameter or area in a plane normal to the respective ULOS) may be maximized, and thus enables maximizing operational range of the radar system, for example, given the size constraints of the assembly housing 180 or of the apparatus 100.

The aperture of the sensing/emitting unit 140 may have a linear dimension (i.e., a diameter or width of the aperture of the unit), that is a proportion of the corresponding linear dimension of the apparatus aperture. This proportion may include, in at least some embodiments of the invention, any one of the following ranges, or any combination of the following ranges: 0.5 to 0.6; 0.6 to 0.7; 0.7 to 0.8; 0.8 to 0.85; 0.8 to 0.9; 0.85 to 0.9; 0.85 to 0.95; 0.9 to 0.95; 0.9 to 0.98; 0.95 to 0.98; 0.95 to 1.0; 0.9 to 1.0. Additionally or alternatively, the aperture of the sensing/emitting unit 140 may have an area dimension (i.e., the area of the aperture of the unit), that is a proportion of the corresponding area dimension of the apparatus aperture. This proportion may include, in at least some embodiments of the invention, any one of the following ranges, or any combination of the following ranges: 0.5 to 0.6; 0.6 to 0.7; 0.7 to 0.8; 0.8 to 0.85; 0.8 to 0.9; 0.85 to 0.9; 0.85 to 0.95; 0.9 to 0.95; 0.9 to 0.98; 0.95 to 0.98; 0.95 to 1.0; 0.9 to 1.0.

In alternative variations of this embodiment, the first sensing/emitting unit 140 is in the form of an emitting unit, and may comprise a radar jammer arrangement, for example and thus is configured for emitting electromagnetic energy in the form of a radar jamming signal. In yet other variations of this embodiment, the first sensing/emitting unit 140 comprises a passive radar detector, for example any suitable SIGINT module for intercepting signals, optionally including at least one of an ELINT module and a COMINT module, for example for detecting the existence and location of a target radar. In yet other variations of this embodiment, the first sensing/emitting unit 140 comprises any passive radar means which is configured for receiving radar signals from a target, which for example may be illuminated by a different source. In such variations, the first sensing/emitting unit 140 comprises a suitable antenna such as for example said antenna 142. In these cases, maximizing the antenna aperture results in maximizing the operational range of the radar jammer, SIGINT module, or radar system, and so on.

Figure 6:
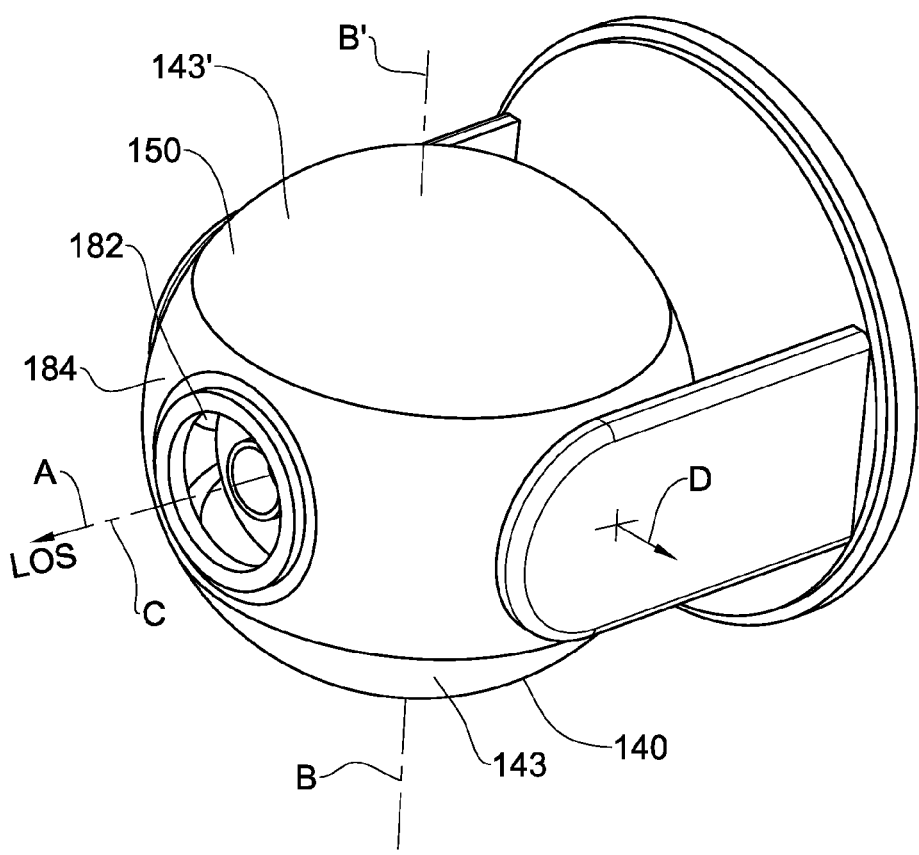
FIG. 6 is an isometric view of a variation of the embodiment of FIG. 1, in which one sensing/emitting unit is aligned with a desired system line of sight.
Figure 7:
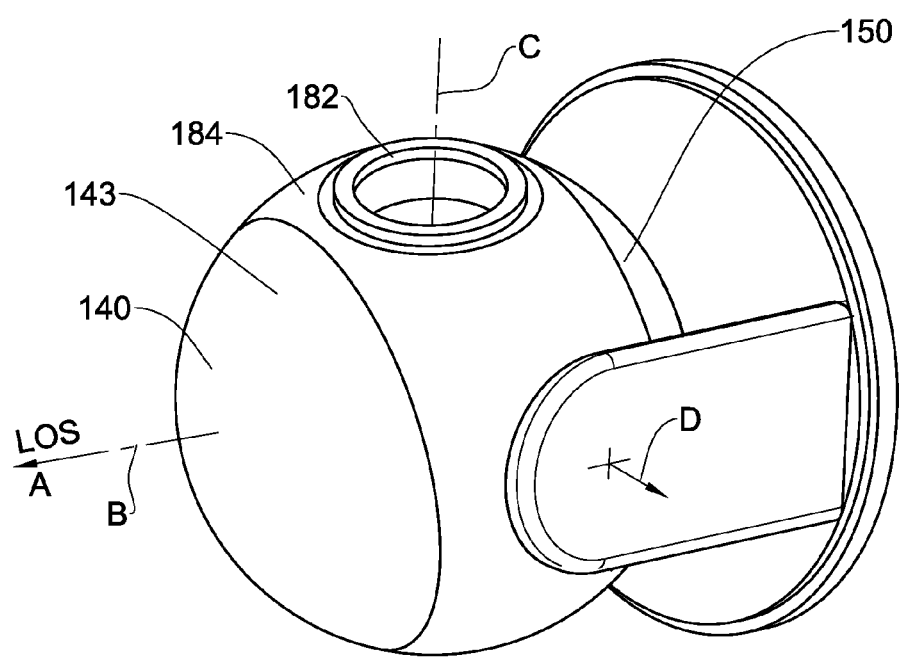
FIG. 7 is an isometric view of the embodiment of FIG. 6, in which another sensing/emitting unit is aligned with a desired system line of sight.

In alternative variations of this embodiment, the first sensing/emitting unit 140 comprises a radar system configured for sensing and/or emitting radar signals, and has an antenna arrangement optimized for the dimensional constraints of the envelope provided by the housing. Furthermore, the unit 140, in particular the antenna thereof, may comprises other transmitting and/or sensing means, such as for example a secondary antenna such as a guard antenna, and/or IFF (identify friend or foe) elements such as for example dipoles and so on, and/or radio transmitting elements as may be used, for example, for transmitting control signals to a vehicle or installation that may be homed onto via the radar system. Optionally, the aperture of the antenna may be optimized to take into account the space required for such means, Alternatively, and as illustrated in FIGS. 6 and 7, in a variation of the first embodiment, the sensing/emitting unit 140 may comprise a radar detector having a conformal antenna 143. The conformal antenna 143 can have the same cross-section and aperture (width and area) as the planar array antenna, and in some cases a greater aperture, and frees the internal space defined in the concavity formed within the antenna, which can be efficiently used for housing one or more other sensing/emitting units. The conformal antenna 143 comprises an external surface that is conformal with a first portion of the aforementioned envelope, and comprises a portion of an imaginary spherical surface, while the assembly housing 184 in this variation of the first embodiment is conformal with a second portion of the imaginary spherical surface. The conformal antenna 143 is centered on the axis B in a similar manner to antenna 142 in the embodiment of FIGS. 1 and 2, mutatis mutandis, and maximizes utility of the envelope by effectively constituting part of the housing. Thus, the size of the antenna 143, relative to the housing 184, can be maximized to take up virtually a full hemisphere of the imaginary surface of the envelope, save for the window 182, and in further variations of this embodiment, the antenna 182 can in effect also act as half of the housing in which the remainder of assembly 110 can be accommodated.

In this embodiment, the second sensing/emitting unit 160 is configured as a sensing unit and comprises an electro-optic scanner arrangement, including any suitable type of light-sensitive sensor, and may have one or more electro-optical devices that may be optically coupled to scan, concurrently or alternately, along the axis C, and each having an optical axis and a suitable field of view (FOV) associated with the ULOS or axis C. Optionally, a plurality of electro-optical devices may be provided as a sub-assembly, each device having its own optical axis or ULOS parallel to axis C, which may represent the mean LOS direction for the unit 160. The housing 180 comprises a suitable window 182 aligned with the axis C to allow electromagnetic radiation at least in the operating wavelengths of the second sensing/emitting unit 160 to pass therethrough.

In this embodiment, the aperture of the unit 160 is not maximized with respect to the width of the envelope, as defined by housing 180, since operation of the unit 160 may be optimized with much smaller aperture than the maximum width of the envelope. On the other hand, the aperture of the unit 160, i.e., the plane with respect to which the aperture of the unit may be defined, is angularly displaced from that of the first unit 140 with respect to the switching axis D, and thus the two apertures do not overlap in an obscurating manner, or interfere with one another. Nevertheless, in other variations of this embodiment, by enabling the second sensing/emitting unit to be exclusively aligned along the system LOS A when thus selected, the aperture of the second sensing/emitting unit may be maximized, and thus allow for maximum resolution given the size constraints of the housing 180 or of the apparatus 100.

In the first embodiment, the second sensing/emitting unit 160 is generally configured for procuring optical images in electronic/digital form, for further processing, storage and/or transmittal via suitable equipment. These images may be still images (frames) and/or video images, and the sensing/emitting unit 160 may be configured for providing such images in the visible electromagnetic spectrum, and/or in the non-visible spectrum, for example infra red and/or ultraviolet, and/or multi/hyper-spectral. Additionally or alternatively, sensing/emitting unit 160 may alternatively or additionally be configured for night vision and/or thermal imaging. In alternative variations of this embodiment, sensing/emitting unit 160 may be configured for emitting energy and comprises a pulsed laser designator for finding a range and marking a target, for example, and/or comprises means for providing an active illumination. In yet other alternative variations of this embodiment, the sensing/emitting unit 160 may be configured for both sensing energy and emitting energy.

In some variations of this embodiment, second sensing/emitting unit 160 may additionally or alternatively capture the images on photographic film, which can be retrieved for processing at a convenient time, for example after recovery of the apparatus 100, or by suitably ejecting the film, for example enclosed in a capsule, by means of a suitable arrangement, as is known in the art.

The aforesaid first unit 140 and second unit 160 each need only comprise the specific equipment or any means that is required to be actually aligned with the system LOS in order to enable the respective unit to operate along the system LOS. For example, regarding the first unit 140, only the antenna 143 (and any equipment that needs to be mechanically coupled or otherwise physically connected thereto) needs to provided within the aforesaid envelope, and any additional equipment needed for the operation of the first unit 140, but that does not need to be aligned with the LOS, or physically mechanically mounted to the antenna, may optionally be accommodated elsewhere, for example in a pod or other structure rearwards of the apparatus 100, and suitably operatively connected thereto. Similarly with respect to the sensing/emitting unit 160 mutatis mutandis.

The apparatus 100 is configured for selectively and alternately aligning one or another of the first sensing/emitting unit 140 and the second unit 160 to point, and thus enable at least one of sensing and emitting energy during operation thereof, along a system line of sight (LOS) A, and for maintaining the LOS A pointed in a desired direction during operation of the selected sensing/emitting unit when aligned therewith.

The system LOS, A, may be defined as a desired discrete direction in which it is desired to sense energy and/or transmit energy with each of the sensing/emitting units in turn, for example along an imaginary line from the geometric center GC of the assembly 110 to the center of a target or target area that it is desired to be scanned or sighted by the apparatus 100. Herein, "target" and "target area" may include any stationary or moving object, or indeed any location or part of a scene, within an external environment with respect to the apparatus 100.

The switching mechanism 120 in this embodiment comprises a suitable drive motor 130 for rotating the sensing/emitting assembly 110 through at least an angle ±90° (in variations of the illustrated embodiment, by a respective angular displacement of at least ±θ) about turning axis D, also referred to herein as the switching axis. Thus, and referring to FIG. 1, starting with axis C in alignment with, i.e., pointing along the LOS A, the switching mechanism 120 can selectively rotate the assembly 110 by angle +90° (in variations of the illustrated embodiment, by a respective angular displacement of at least ±θ) about turning axis D to enabling selective alignment of axis B with LOS A (FIG. 2). A similar situation applies when starting with axis B aligned and switching to having axis C aligned, mutatis mutandis, i.e., conversely, the switching mechanism 120 can selectively rotate the assembly 110 angle −90° (in variations of the illustrated embodiment, by a respective angular displacement of at least −θ), in the opposite direction about turning axis D to enabling selective re-alignment of the original axis C with LOS A, i.e., pointing along the LOS, as required or desired.

In at least some variations of this embodiment, realignment may be achieved by turning rotating the assembly by (360°−θ) in the original turning direction, rather than by the corresponding angle −θ in the opposed direction.

Thus, when one or another of the respective ULOS, i.e. axes B, C, is aligned with the system LOS A, the full aperture of the respective sensing/emitting unit 140, of the respective sensing/emitting unit 160 is available to be pointed along the system LOS A, while the other sensing/emitting unit is not aligned along the system LOS A and the aperture associated therewith is not available to be pointed along the system LOS A and is not overlapping with the aperture of and does not interfere with operation of the aligned sensing/emitting unit. In other words, the aligned sensing/emitting unit is in an operative state, while the other, non-aligned sensing/emitting unit is in a non-operative state. By "operative state" is meant that the respective ULOS of the sensing/emitting unit is aligned along the system LOS A, enabling the respective sensing/emitting unit to operate with respect to the system LOS.

The housing 180 defines said envelope within which the assembly 110 is accommodated. The envelope has a maximum width, defined along a direction parallel to axis D, and this maximum width is located coaxially with the aforesaid axis D. In at least some applications of this embodiment, this maximum width is predefined to enable installation and operation of the apparatus with respect to a pod or other structure of pre-existing dimensions. According to one aspect of the invention, it is possible to maximize the aperture of one or more sensing/emitting unit independently of one another, thus enabling maximizing the performance of the sensing/emitting unit that is exclusively aligned with the system LOS A, given the dimensional constraints provided by the apparatus, in particular the maximum width of the aforesaid envelope. The performance of the sensing/emitting unit may include, depending on the nature of the sensing/emitting unit, one or more of the quality of generated images, signal strength, output power of an emitting element, range, resolution, etc. associated with the sensing/emitting unit.

The maximum aperture of each sensing/emitting unit in this embodiment is constrained mainly by the maximum width required for the housing 180, and in particular the maximum cross sectional area thereof in a direction orthogonal to the LOS, and the internal volume of the envelope.

In variations of this embodiment, the housing 180 may be omitted, and the said envelope may be an imaginary envelope that is defined by a variety of dimensional constraints imposed by the environment or structure in which the apparatus is to be installed and operated. In any case, according to one aspect of the invention, the assembly is configured for being accommodated in the envelope such that the sensing/emitting units are enclosed therein in a compact manner, and wherein at least operation of one sensing/emitting unit is optimized with respect to a characterizing dimension of the envelope. In at least some embodiments of the invention, this characterizing dimension is the aforesaid maximum width of the envelope, which is defined to be generally coaxial with the switching axis of the assembly.

In variations of this embodiment, one or more said sensing/emitting units may be configured for locally varying the direction of each respective ULOS, for example by means of rotational drives, to provide one or two degrees of freedom for the or each respective sensing/emitting unit. In such cases, the movement envelope of the individual sensing/emitting unit may be restricted by the apparatus aperture, for example as provided by a window of the like in the housing.

In the illustrated embodiment, the apparatus 100 further comprises a pointing mechanism 300 for enabling the system LOS A to be pointed in any desired direction with respect to a structure onto which the apparatus 100 may be mounted, within a field of regard (FOR). Pointing mechanism 300 is configured for providing at least two degrees of freedom in rotation for the apparatus 100, which effectively results in being able to point the system LOS A along any desired direction with three degrees of freedom in rotation, as will be further explained below, within the available field of regard (FOR).

Pointing mechanism 300 comprises a tilt arrangement 320 and a pan arrangement 340.

Pan arrangement 340 is incorporated in the support bracket 200, wherein base member 220 is mounted for rotation to a stationary mounting bracket 250, via a bearing or the like (not shown), for example, for providing one degree of freedom in rotation for the apparatus 100 about pan axis E. The mounting bracket 250 is configured for mounting the apparatus 100 to a desired structure (or location), for example on a mobile or aerial platform such as for example an air vehicle, or alternatively to a static structure. Thus, the apparatus 100, including support bracket 200 together with the assembly 110, can be rotated about pan axis E. A suitable controllable drive motor (not shown) is provided for controllably rotating the base member 220 with respect to the mounting bracket 250 about axis E through any desired pan angle Φ.

In this embodiment, the pan arrangement 320 is incorporated with the switching mechanism 120, and enables the system LOS A of assembly 110 to be rotated through any desired tilt angle α about axis D with respect to the support bracket 200, and the drive motor 130 may also be used for this purpose. Alternatively, a different drive motor may be used for providing the desired tilt angle α about axis D. In practice, one sensing/emitting unit ULOS, say axis B, is aligned with the system LOS A, such that the first sensing/emitting unit 140 is pointing it's ULOS in the desired direction A. When it is desired to point the system LOS A along a different tilt direction, the tilt angle α may be changed by rotating the assembly 110 correspondingly, thereby concurrently keeping the axis C aligned with the system LOS A. On the other hand, if it is desired to switch to sensing/emitting unit 160 at this system LOS A, the assembly 110 is rotated by the appropriate angle θ about axis D so that now the ULOS or axis C of the second sensing/emitting unit 160 is now aligned along the system LOS A. Although the assembly 110 has been rotated about axis D by angle θ, it is deemed to still be at the same tilt angle as before the switching operation, since the system LOS A is effectively unchanged, and sensing/emitting is still being carried out along direction A, though now with the second sensing/emitting unit, 160. Switching operation about axis D is thus independent of and different from panning about axis D, even when the same drive mechanism is using for driving both the switching and the panning.

Operation of the pan arrangement and the tilt arrangement is controlled by a suitable controller, which may comprise a preloaded program of operations, and/or a communications module (not shown) for controlling the pointing mechanism 300 from a remote location, for example.

Rotation of the assembly 110 about axis E (sometimes together with rotation about axis D) can provide an azimuth direction for system LOS A, while rotation of assembly 110 about axis E can provide an elevation for system LOS A, and any suitable combinations of the two rotations enable the system LOS A to be pointed wherever required within a predetermined envelope or field of regard (FOR) in three dimension space.

The global extent of the FOR is generally determined by the actual position and orientation of the vehicle onto which the apparatus 100 is mounted, in applications where the apparatus is thus mounted. On the other hand and the local extent of the FOR with respect to the apparatus 100 may be defined by taking into account physical constraints, such as for example obscuration or blind spots created by relative position of the vehicle or other mounting structure with respect to the assembly 110.

Figure 3:
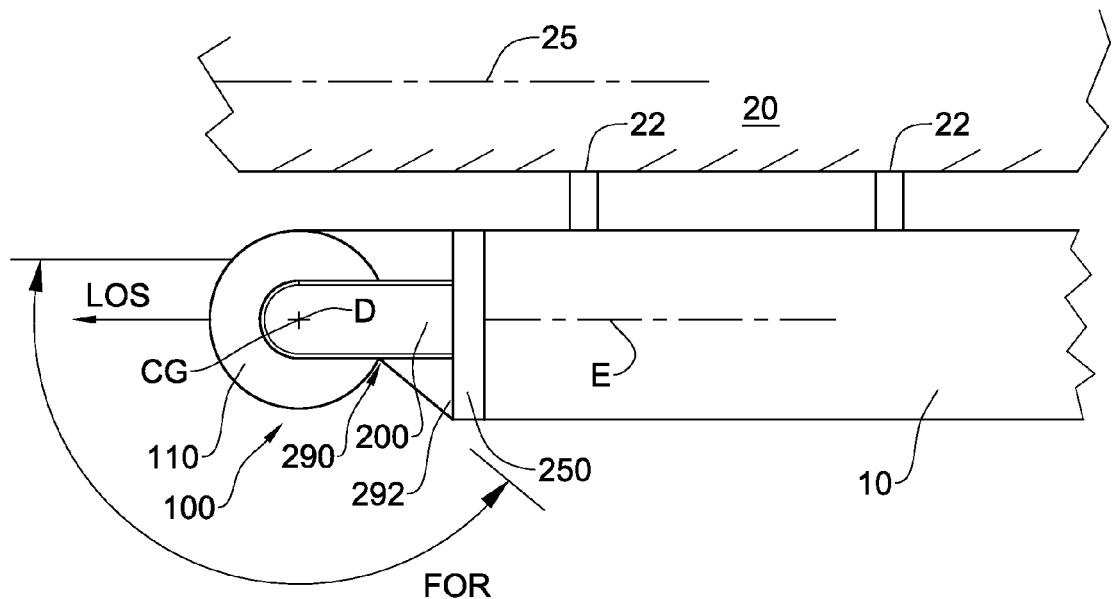
FIG. 3 is a side view of the embodiment of FIG. 1, in an application wherein the apparatus is comprised mounted to a pod.

Referring also to FIG. 3, the apparatus 100 according to the first embodiment is adapted for being integrated into a pod 10 via mounting bracket 250. The pod 10 is configured for being mounted onto the standard hooking points of an aircraft 20, such as for example underbelly attachment points or underwing attachment points 22 of a combat aircraft. Such a pod 10 may be generally cylindrical and elongate, and may comprise suitable auxiliary equipment, for example RF transceiver, communication equipment and son on, and in particular including one or more of a controller and computer for controlling the operation of the apparatus 100 and for receiving and optionally analyzing, transmitting and/or recording data received from the first and second sensing/emitting units 140, 160. The auxiliary equipment may optionally further comprise inertial sensors and GPS system for determining the velocity and acceleration vectors, and position, respectively, of the pod 10, and thus of the apparatus 100 and of the aircraft 20 on which the pod 10 is mounted. The axis E is generally aligned with the longitudinal axis 25 of the aircraft, and thus the pan axis E is effectively a roll axis. Similarly, the tilt axis D is effectively a pitch axis when aligned in the general direction parallel to the wings of the aircraft, or in the horizontal direction when the aircraft is in the horizontal position. It is also clear that by rolling the apparatus 100 about the roll axis E by 90° so that the axis D is now oriented generally perpendicular to the wings, or in the vertical direction when the aircraft is in the horizontal position, any tilt rotation a about axis D is effectively a yaw rotation.

Optionally, an aerodynamic fairing 290 may be provided for covering the downstream gap between the housing 180 and the base member 220, and configured for providing the widest possible FOR. Thus, for example, a lower portion 292 of the fairing 290 may have a profiled determined by the angle subtended from the GC to the base member 220, for example.

Figure 4:
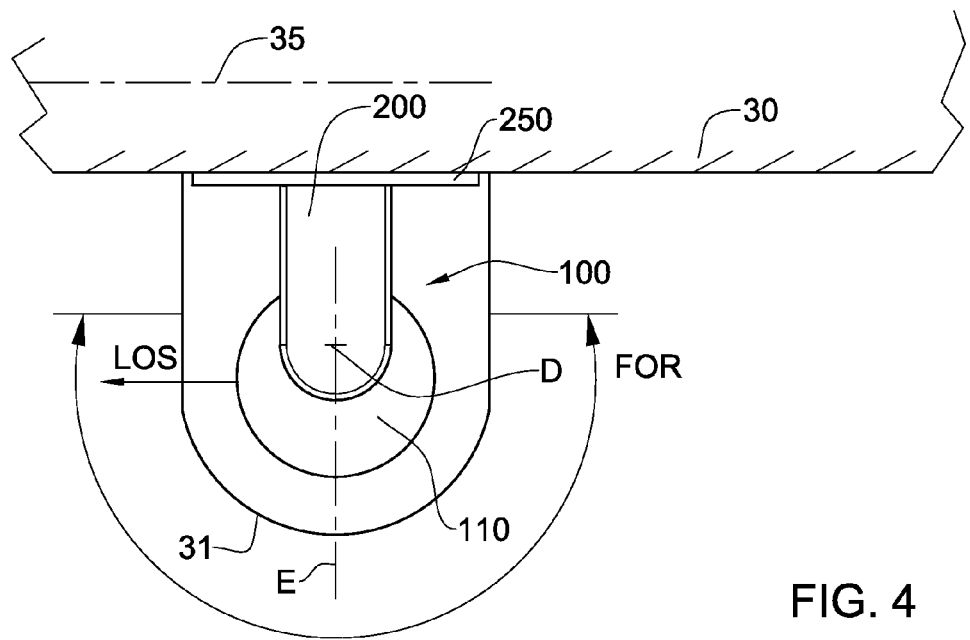
FIG. 4 is a side view of the embodiment of FIG. 1, in an application wherein the apparatus is comprised mounted directly to a vehicle.

In an alternative application of apparatus 100 according to a variation of the first embodiment, and referring to FIG. 4, the apparatus may be mounted directly to the underside of an aircraft 30, for example a reconnaissance aircraft, balloon, helicopter, UAV, and so on, via the mounting bracket 250, such that the pan axis E is generally aligned perpendicularly with respect to the longitudinal axis 35 of the aircraft, and thus the pan axis E is effectively a yaw axis. In other words, the pan axis E is in the vertical direction when the aircraft is in the horizontal position. On the other hand, the tilt axis D is effectively a pitch axis when aligned in the general direction parallel to the wings of the aircraft, or in the horizontal direction when the aircraft is in the horizontal position. It is also clear that by yawing the apparatus 100 about the axis E by 90° so that the axis D is now oriented generally along the longitudinal axis of the aircraft, any tilt rotation about axis D is effectively a roll rotation. In this embodiment, auxiliary equipment may also be provided, for example as for the embodiment of FIGS. 1 to 3, mutatis mutandis, wherein the auxiliary equipment may be accommodated within the body of the aircraft and operatively connected to the apparatus 100 via suitable cables, optic fiber and so on. In the illustrated embodiment, the apparatus 100 is enclosed in a fairing or radome 31, which is configured to protect the apparatus 100 from the elements, while not interfering with operation thereof, including any movement of the component parts thereof, and is made from materials that are transparent, and provide minimal or zero distortion, with reference to the particular energy that is being sensed and/or emitted by the sensing/emitting units of the apparatus 100 via the radome or fairing 31.

Optionally, the apparatus 100 may further comprise a plurality of additional sensing/emitting units, and referring to FIGS. 1 and 2, two additional sensing/emitting units, 150, 170 are provided in sensing/emitting assembly 110. In this embodiment sensing/emitting unit 150 has a ULOS along axis B', substantially co-axial with axis B of the first sensing/emitting unit 140, but pointing in a diametrically opposed direction with respect thereto. Similarly, sensing/emitting unit 170 has a ULOS along axis C', substantially co-axial with axis C of the second sensing/emitting unit 160, but pointing in a diametrically opposed direction with respect thereto. Alternatively, the axes B' and C' may be pointing in any suitable direction, radiating from the GC or axis D, and are coplanar with axes B and/or C, or are on planes parallel to the plane containing axis B and/or axis C. Switching mechanism 120 operates in a similar manner to that described for the first and second sensing/emitting units, mutatis mutandis, and allows each of the sensing/emitting units 140, 150, 150, 170 to be selectively and exclusively aligned to point in the desired system LOS A by correspondingly rotating the assembly 110 about axis D so that the respective sensing/emitting axis is aligned with the LOS. The additional sensing/emitting units 150, 170, may be similar to sensing/emitting units 140, 160, for example, and are similarly configured for providing optimal operation within the constraints of the apparatus, while not overlapping their respective apertures with the apertures of the apertures of the other sensing/emitting units along the respective sensing/emitting axes or the system LOS A. In the illustrated embodiment of FIGS. 1 and 2, sensing/emitting unit 150 comprises a radar system having antenna 152, similar to the first sensing/emitting unit 140 mutatis mutandis, and sensing/emitting unit 170 comprises an electro-optic scanner arrangement, similar to the second sensing/emitting unit 160 mutatis mutandis, the housing 180 also comprising window 182' aligned with axis C'. The additional sensing/emitting units 150, 170, may be provided for any number of purposes. For example, an additional radar system and an additional electro-optic scanner arrangement may provide redundancy in case of failure of one or both of the sensing/emitting units 140, 160. Alternatively, sensing/emitting unit 150 may comprise a SAR radar system, while sensing/emitting unit 140 comprises a radar jammer, and for example sensing/emitting unit 160 may comprise an optical scanner arrangement operating in the visible spectrum, while sensing/emitting unit 170 is equipped for night vision and/or for providing a laser Radar function.

In the variation of the first embodiment, illustrated in FIGS. 6 and 7, the additional sensing/emitting unit 150 also comprises a conformal radar antenna 143', similar to antenna 143, mutatis mutandis.

Thus, the switchable ULOS feature provided by the apparatus 100 enables the effective aperture, and performance, of one or more sensing/emitting units to be maximized for a given envelope maximum width or other parameter such as the envelope cross-section or volume. In the illustrated embodiment of FIGS. 1 and 2, where the apparatus 100 is affixed to a pod 10 or the like, which in turn may be mounted to an aircraft, it is often desirable to minimize the cross-sectional area of the pod in the general direction of travel of the aircraft, for minimizing drag and other aerodynamic forces induced on the pod/apparatus assembly. In other applications, pods come in specific sizes including a standard cross-section, and it may be desired to retrofit the apparatus 100 for installation in such a standard pod. In other applications, space, weight, logistic or economic considerations may dictate an optimum or particular size for the apparatus, which in turn defines a maximum volume, cross-sectional area or width for the envelope in which the assembly is to be accommodated. Thus, the first embodiment enables maximum aperture to be provided for the first sensing/emitting unit 140 while providing the required performance also from the second sensing/emitting unit 160, for a particular pod size (diameter), where otherwise, two different pods would need to be employed, each with a different sensing/emitting unit, to provide the same aperture for each of the sensing/emitting units or to avoid overlapping apertures. Similar considerations may also apply to the embodiment illustrated in FIG. 4, mutatis mutandis.

In one particular application of the first embodiment, the apparatus 100 may be mounted to an aerial pod 10 of standard size, having an external diameter of about 40 cm, and configured for being mounted to standard mounting points of an aircraft.

According to one aspect of the invention, the LOS A of the apparatus (mounted onto a moving aircraft, for example) may be selectively chosen directed in a general direction of a suspected or known target, for example, and the apparatus 100 may be used for surveillance of the target, including for example one or more of detecting, imaging, recognizing, identifying, homing or tracking the target. The direction of the LOS A may be initially calculated or otherwise estimated or guessed, given the general coordinates of the target according to a global system of coordinates, and the position and velocity and acceleration vectors of the apparatus 100 (i.e., of the carrier aircraft) with respect to the same global coordinate system. The apparatus 100 may be operatively connected to a suitable Inertial Navigation System for providing, in real time, navigation and orientation data of the apparatus with respect to the global coordinate system, for example. The first sensing/emitting unit 140, comprising a directional radar system, is first used for sensing/emitting the target by detecting the same, and axis B is aligned along LOS A. By maximizing the size of the antenna 142 within the housing 180, the range of the radar unit can be maximized for a given apparatus size, providing accurate position and range data for the target for a desired range, in all weather conditions, day or night, for example. In some application, this range may be for example between about 60 km and about 100 km, say about 80 km nominal, while in other applications, the range may be for example between about 10 km and about 60 km, say about 30 km nominal. Particularly when the radar system is an SAR or the like, the radar scans may provide an optical-like display of the target zone along the LOS A, though such displays are often difficult to interpret by a pilot, in particular to enable visual identification of the target, or discrimination between various potential targets (including possible "friendly" targets) in the target zone, though sometimes target recognition is possible. The LOS A, with the sensing/emitting unit 140 aligned therewith, may be kept homed in on a particular target, for example by an automated closed loop procedure wherein the pointing mechanism 300 is controlled by means of controller such as to compensate for the position and direction of motion of the aircraft (and thus the apparatus 100), as well as for changes in the position and direction of the target itself where appropriate, and thus continuously maintain the sensing/emitting unit 140 continuously pointing in the desired LOS A.

In at least one mode of operation, when the aircraft (and thus the apparatus 100) is within a particular range limit associated with the second sensing/emitting unit 160, the switching apparatus 120 aligns the axis C of the second sensing/emitting unit 160 along the LOS A, so that the target may now be sighted with the electro-optical devices. During the transition switching between the two sensing/emitting units, the controller may optionally estimate the change in the direction of the desired LOS A, taking into account the position and velocity and acceleration vectors of the aircraft (and thus apparatus 100), as well as of the target itself, based on the target's trajectory in a previous time span of say, less than 1 second for example, so that as the second sensing/emitting unit 160 is aligned along the LOS A, the LOS A (an thus the axis C) is homed onto the estimated location of the target. In other applications, for example where the aircraft is not fast moving and/or the target is stationary and/or the transition time for the switching operation is relatively small, it may not be necessary or desired to estimate the position of the LOS A during transition, and instead the second sensing/emitting unit 160 is simply aligned with the current position of the LOS A. The second sensing/emitting unit 160 provides different information regarding the target, allowing the target to be identified, so that additional steps may optionally be taken, for example targeting, tracking and so on.

Alternatively, the apparatus 100 may be used to first searching for and detecting a target, and a search and detection protocol may be programmed for sensing a particular target area with the first sensing/emitting unit 140 comprising a radar system, according to any suitable search and detection protocol.

In some variations of the first embodiment, the apparatus 100 does not comprise pointing mechanism 300, which may thus be omitted, and the apparatus may be statically mounted to a vehicle or static structure via base member 200, with the system LOS A pointing in a fixed desired direction with respect to the vehicle or structure, and in operation one or another of the axes B, C is selectively aligned with the LOS A so as to point the ULOS of the respective sensing/emitting unit along the LOS A continuously, until it is desired to switch sensing/emitting units, whereupon the other sensing/emitting unit is aligned to have its respective ULOS point along the LOS A. For example, the system may be mounted to a static structure such that the system LOS A is pointing in the direction where an airborne threat is expected to come.

In the first embodiment, and variations thereof in which the first sensing/emitting unit 140 comprises a radar system for sensing electromagnetic energy in radar wavelengths, and the second sensing/emitting unit 160 comprises an electro-optic sensor, for sensing electromagnetic energy in optical wavelengths, the criteria for switching between aligning one and the other sensing/emitting unit with the LOS A is often the range to a particular target of interest, so that the apparatus switches to the second sensing/emitting unit 160 when the distance to a target is within a particular threshold that is compatible with enabling a target to be recognized and identified visually thereby.

In other variations of this embodiment, the switching criteria may be different. For example, where the apparatus comprises two sensing/emitting units that are both electro-optical sensing units, but with different resolutions or fields of view, the apparatus may switch between one unit providing a wide angle view of a scene under surveillance, to another unit providing a narrower field of view but with greater resolution or magnification when it is desired to investigate a particular area of the scene.

In at least some variations of this embodiment, one or more said sensing/emitting units may be configured for locally varying the direction of the respective ULOS, for example by means of internal gimbals including rotational drives, to provide one or two degrees of freedom for the or each respective sensing/emitting unit, at least when the respective/emitting unit is in its operative state. In such cases, the movement envelope of the individual sensing/emitting unit may be restricted by the apparatus aperture, for example as provided by a window of the like in the housing. Thus, each sensing/emitting unit may provide an expanded local field of view, while in its operative state.

According to a another aspect of the invention, the apparatus 100 may be operated for simultaneously sensing/emitting along two or more different lines of sight, each of which is defined along a sensing/emitting axis of a corresponding sensing/emitting unit. For example, referring to FIGS. 8 and 9, the embodiment of FIG. 6 may be used for enabling simultaneous operation of any number and/or combination of the sensing/emitting units 140, 150, 160 along a plurality of system lines of sight.

Figure 8:
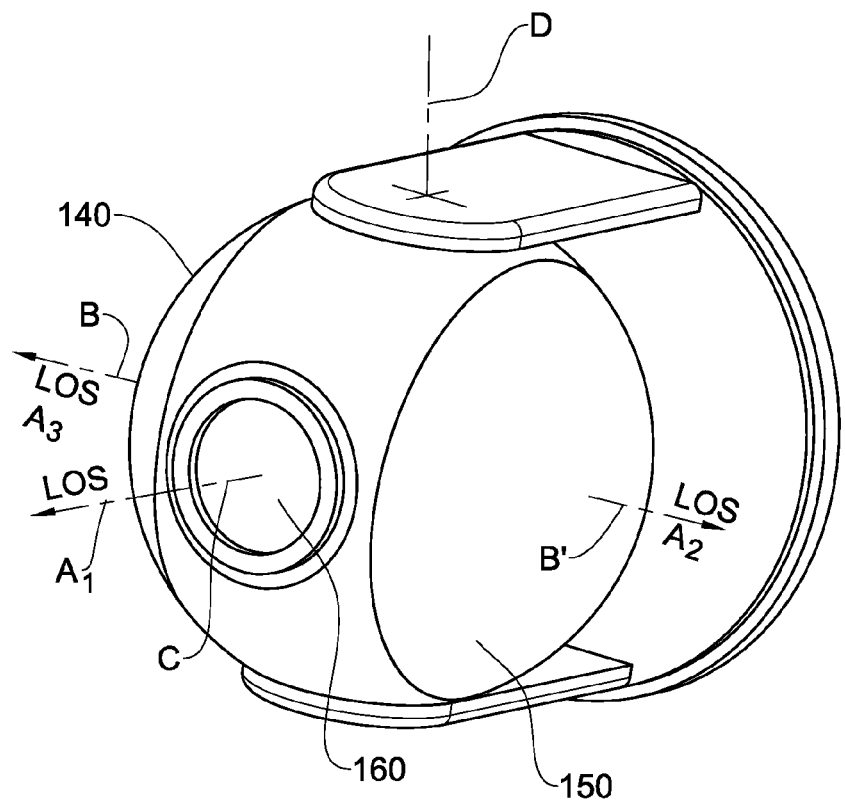
FIG. 8 is an isometric view of the embodiment of FIG. 6, in which a set of three sensing/emitting units are aligned with three respective desired system lines of sight.

For example, in FIG. 8, sensing/emitting units 140, 150, each comprising a radar unit, operate along diametrically opposed lines of sight A3, A2, respectively, aligning their respective ULOS or axes B, B' to point along A3, A2, respectively, providing detection and optionally recognition data along the two directions A3, A2. At the same time, sensing/emitting unit 160, comprising an electro-optical scanning arrangement, can provide at least identification data for targets, along line of sight A1, which is different from the LOS's A2 and A3, by aligning axis C to point along LOS A1.

Figure 9:
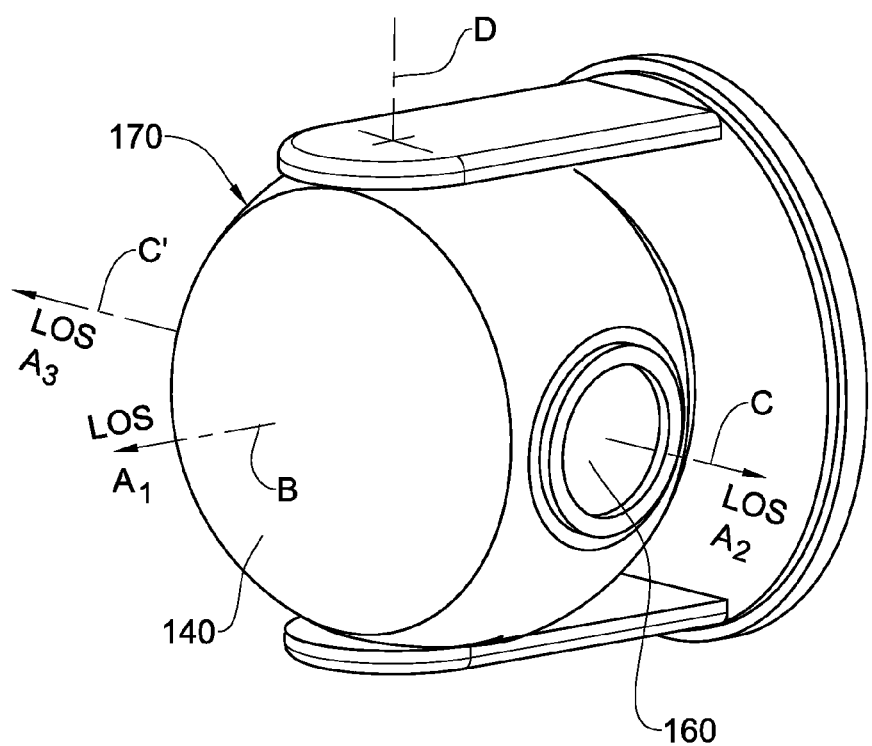
FIG. 9 is an isometric view of the embodiment of FIG. 8, in which a different set of three sensing/emitting units are aligned with the three respective desired system lines of sight.

Switching mechanism 120 can be operated to selectively rotate the assembly 110 about axis D, so as to align a different combination of sensing/emitting units along the desired LOS A, A2, A3, when desired. Thus, as illustrated in FIG. 9, sensing/emitting units 160, 170 are now aligned with their axes C, C' along LOS A2, A3, respectively, while sensing/emitting unit 140 is now aligned with its axis B pointing in direction of LOS A1, while sensing/emitting units 150 is not aligned along any one of the system LOS A1, A2 or A3.

In variations of this embodiment, one or more said sensing/emitting units 140, 150, 160 may be configured for locally varying the direction of each respective ULOS, for example by means of internal gimbals including rotational drives, to provide one or two degrees of freedom for the or each respective sensing/emitting unit. In such cases, the movement envelope of the individual sensing/emitting unit may be restricted by the apparatus aperture, for example as provided by a window of the like in the housing. Thus, each sensing/emitting unit 140, 150, 160 may provide an expanded local field of view.

Thus, according to this aspect of the invention, it is also possible to operate the apparatus 100 to selectively switch between sensing/emitting units, for each of a plurality of LOS, though in a mechanically coupled manner.

Whilst some particular embodiments have been described and illustrated with reference to some particular drawings, the artisan will appreciate that many variations are possible which do not depart from the general scope of the invention, mutatis mutandis.

The invention claimed is:

1. An apparatus for at least one of sensing and emitting energy along an apparatus line of sight (LOS) with respect to said apparatus, comprising:

at least two sensing/emitting units, each said unit adapted for at least one of sensing and emitting energy along a respective unit line of sight (ULOS);

each sensing/emitting unit having an operative state, wherein the respective ULOS is pointed along said LOS for at least one of sensing and emitting energy, and a corresponding inoperative state, where the ULOS is pointed along a direction different from said LOS;

a switching mechanism for switching between said units to selectively bring a desired unit exclusively into its respective operative state while concurrently bringing a remainder of said units each to a respective non-operative state;

wherein a first said sensing/emitting unit is configured for at least one of sensing and emitting energy when an operational parameter associated with operation of said device is greater than an operational threshold and wherein a second said sensing/emitting unit is configured for at least one of sensing and emitting energy when said operational parameter is at or less than said operational threshold.

2. The apparatus according to claim 1, wherein said switching mechanism is configured for automatically reversibly switching between said units to bring said first unit or said second unit into its operative state, respectively, according to whether said operational parameter is greater than or not greater than said operational threshold.

3. The apparatus according to claim 1, wherein said operational parameter includes a distance to said target, and wherein said operational threshold is a first distance.

4. The apparatus according to claim 1, wherein said operational parameter includes a visibility range along said LOS, and wherein said operational threshold is visibility correlated with adverse weather conditions.

5. The apparatus according to claim 4 wherein said operational threshold is zero visibility conditions.

6. The apparatus according to claim 1, wherein a first said sensing/emitting unit comprises at least one radar system configured for at least enabling detecting a target along its respective ULOS.

7. The apparatus according to claim 1, wherein a second said sensing/emitting unit comprises at least one electro-optical device.

8. The apparatus according to claim 7, wherein said second sensing/emitting unit is configured for at least one of: enabling providing images in at least one of the visible, infra red and ultraviolet electromagnetic spectrum; night vision; enabling providing pulsed laser designator for targeting; enabling any suitable form of thermal imaging.

9. The apparatus according to claim 1, said first sensing/emitting unit comprising a first said radar system having a first ULOS and said second sensing/emitting unit comprising said electro-optical system having a second ULOS, wherein said first and second ULOS are angularly displaced one from the other with respect to said switching axis.

10. The apparatus according to claim 9, further comprising a second said radar system having a third ULOS in a direction substantially opposed to said first ULOS.

11. The apparatus according to claim 1, further comprising a suitable pointing mechanism, configured for enabling selectively defining said LOS in a desired direction at least within a field of regard (FOR), enabling a said sensing/emitting unit having its respective ULOS aligned with said LOS to be selectively pointed in said desired direction therewith.

12. The apparatus according to claim 1, wherein each said sensing/emitting unit is configured for providing data associated with at least one of surveillance, viewing, locating, sighting, detection, recognition, identification, tracking, targeting, marking, homing, tracking and imaging of a target.

13. The apparatus according to claim 1, wherein said apparatus is configured for first detecting a target by means of one said sensing/emitting unit, and further configured for at least one of recognizing and identifying the target by means of another said sensing/emitting unit.

14. The apparatus according to claim 1, wherein one said sensing/emitting unit comprises a radar system configured for at least detecting the target, and another said sensing/emitting unit comprises an electro-optical sensing unit for at least one of recognizing and identifying the target.

15. The apparatus according to claim 1, wherein the apparatus is further configured for determining the type of target detected or for detecting the presence of a target, and comprises a said sensing/emitting unit configured for detecting and interpreting ESM, COMINT or ELINT signals emitted by the target.

16. The apparatus according to claim 1, wherein the apparatus is further configured for targeting a target, and one said sensing/emitting unit comprises a laser designator for acquiring the target, or, wherein one said sensing/emitting unit is configured for jamming or otherwise electronically incapacitating a target.

17. The apparatus according to claim 1, wherein said apparatus is configured for surveillance and one said sensing/emitting unit an electro-optical unit having a wide angle field of view, and another said sensing/emitting unit comprises an electro-optical sensing/emitting unit having a narrower field of view with greater resolution.

18. A method for at least one of sensing and emitting energy along an apparatus line of sight (LOS) with respect to a target, comprising:

selectively aligning a unit line of sight (ULOS) of a first sensing/emitting unit with said LOS when an operational parameter is greater than an operational threshold;

one of sensing and emitting energy along said LOS with said first sensing/emitting unit;

switching to aligning a ULOS of a second sensing/emitting unit along said LOS, when said operational parameter is at or less than said operational threshold; and one of sensing and emitting energy continuously along said LOS with said second sensing/emitting unit;

wherein said first sensing/emitting unit and said second sensing/emitting unit are mechanically coupled.

19. The method according to claim 18, further comprising reversibly switching between said units to bring said first unit or said second unit into its operative state, respectively, according to whether said operational parameter is greater than or not greater than said operational threshold.

20. The method according to claim 18, wherein said operational parameter is a distance to said target, and wherein said operational threshold is a first distance.

21. The method according to claim 18, wherein said operational parameter includes a visibility range along said LOS, and wherein said operational threshold corresponding to a visibility correlated with adverse weather conditions.

22. The method according to claim 21 wherein said operational threshold is zero visibility conditions.

23. An apparatus for at least one of sensing and emitting energy concurrently along each of at least two different apparatus lines of sight (LOS) with respect to said apparatus, comprising:

an assembly comprising at least two sensing/emitting units, each said sensing/emitting unit adapted for at least one of sensing and emitting energy along a respective sensing/emitting unit line of sight (ULOS) via a respective sensing/emitting unit aperture, wherein said sensing/emitting units are mechanically coupled;

said assembly having a plurality of operative states, including at least a first operative state wherein at least two ULOS are pointed one each along a respective said LOS for at least one of sensing and emitting energy with respect thereto, and at least a second operative state wherein at least one said ULOS is pointed along a LOS different from the LOS in which it was pointing during said first operative state;

a switching mechanism for switching between said units to selectively bring said assembly into a desired said operative state.

24. The apparatus according to claim 23, wherein at least one said sensing/emitting unit may be configured for locally varying the direction of its respective ULOS, to provide at least one degree of freedom for the or each respective sensing/emitting unit.

25. A method for at least one of sensing and emitting energy along an apparatus line of sight (LOS) with respect to a target, comprising:

selectively aligning a unit line of sight (ULOS) of a first sensing/emitting unit with said LOS;

one of sensing and emitting energy continuously along said LOS with said first sensing/emitting unit; and selectively switching to aligning a ULOS of a second sensing/emitting unit along said LOS and one of sensing and emitting energy continuously along said LOS with said second sensing/emitting unit;

wherein said first sensing/emitting unit and said second sensing/emitting unit are mechanically coupled.

* * * * *